US008316003B2

(12) United States Patent
Martin et al.

(10) Patent No.: US 8,316,003 B2
(45) Date of Patent: *Nov. 20, 2012

(54) UPDATING CONTENT OF PRESENTATION VEHICLE IN A COMPUTER NETWORK

(75) Inventors: Anthony G. Martin, Los Altos, CA (US); Scott Vandevelde, Menlo Park, CA (US); David L. Goulden, Redwood City, CA (US)

(73) Assignee: Carhamm Ltd., LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/577,702

(22) Filed: Oct. 12, 2009

(65) Prior Publication Data

US 2010/0179947 A1 Jul. 15, 2010

Related U.S. Application Data

(63) Continuation of application No. 10/462,574, filed on Jun. 16, 2003, now Pat. No. 7,603,341, which is a continuation-in-part of application No. 10/289,123, filed on Nov. 5, 2002, now Pat. No. 7,512,603.

(60) Provisional application No. 60/457,524, filed on Mar. 25, 2003.

(51) Int. Cl.
*G06F 7/00* (2006.01)
*G06F 17/30* (2006.01)

(52) U.S. Cl. ........................................ 707/706; 715/781

(58) Field of Classification Search ........................ None
See application file for complete search history.

(56) References Cited

U.S. PATENT DOCUMENTS

| 4,455,083 A | 6/1984 | Elmes |
| 4,575,579 A | 3/1986 | Simon et al. |
| 4,719,567 A | 1/1988 | Whittington et al. |
| 4,775,935 A | 10/1988 | Yourick |
| 4,782,449 A | 11/1988 | Brinker et al. |
| 4,799,146 A | 1/1989 | Chauvel |
| 4,850,007 A | 7/1989 | Marino et al. |
| 4,977,594 A | 12/1990 | Shear |
| 5,027,400 A | 6/1991 | Baji et al. |

(Continued)

FOREIGN PATENT DOCUMENTS

EP      0631231      12/1994

(Continued)

OTHER PUBLICATIONS

International Preliminary Report on Patentability in PCT Appln. No. PCT/US2004/07714, dated Oct. 1, 2005 [4 pages].

(Continued)

*Primary Examiner* — Uyen T. Le
(74) *Attorney, Agent, or Firm* — Brundidge & Stanger, P.C.

(57) ABSTRACT

Exemplary systems and methods for updating content on a computer network are provided. In exemplary embodiments, a method includes receiving from a message delivery program on a client computer a first keyword submitted by a web browser on the client computer to an original search engine, the original search engine not being a part of the server computer, the web browser being separate from the message delivery program and providing the client computer a first search result that is different from a search result provided by the original search engine.

43 Claims, 17 Drawing Sheets

U.S. PATENT DOCUMENTS

| | | |
|---|---|---|
| 5,029,104 A | 7/1991 | Dodson et al. |
| 5,093,718 A | 3/1992 | Hoarty et al. |
| 5,099,420 A | 3/1992 | Barlow et al. |
| 5,105,184 A | 4/1992 | Pirani et al. |
| 5,159,669 A | 10/1992 | Trigg et al. |
| 5,165,012 A | 11/1992 | Crandall et al. |
| 5,196,838 A | 3/1993 | Meier et al. |
| 5,202,961 A | 4/1993 | Mills et al. |
| 5,220,420 A | 6/1993 | Hoarty et al. |
| 5,220,516 A | 6/1993 | Dodson et al. |
| 5,220,564 A | 6/1993 | Tuch et al. |
| 5,231,499 A | 7/1993 | Trytko |
| 5,247,517 A | 9/1993 | Ross et al. |
| 5,253,341 A | 10/1993 | Rozmanith et al. |
| 5,268,963 A | 12/1993 | Monroe et al. |
| 5,283,639 A | 2/1994 | Esch et al. |
| 5,283,731 A | 2/1994 | Lalonde et al. |
| 5,285,442 A | 2/1994 | Iwamura et al. |
| 5,297,249 A | 3/1994 | Bernstein et al. |
| 5,305,195 A | 4/1994 | Murphy |
| 5,307,456 A | 4/1994 | MacKay |
| 5,313,455 A | 5/1994 | van der Wal et al. |
| 5,315,580 A | 5/1994 | Phaal |
| 5,319,455 A | 6/1994 | Hoarty et al. |
| 5,321,740 A | 6/1994 | Gregorek et al. |
| 5,325,423 A | 6/1994 | Lewis |
| 5,325,483 A | 6/1994 | Ise et al. |
| 5,327,554 A | 7/1994 | Palazzi et al. |
| 5,333,237 A | 7/1994 | Stefanopoulos et al. |
| 5,347,632 A | 9/1994 | Filepp et al. |
| 5,355,472 A | 10/1994 | Lewis |
| 5,355,501 A | 10/1994 | Gross et al. |
| 5,361,091 A | 11/1994 | Hoarty et al. |
| 5,361,199 A | 11/1994 | Shoquist et al. |
| 5,361,393 A | 11/1994 | Rossillo |
| 5,367,621 A | 11/1994 | Cohen et al. |
| 5,373,375 A | 12/1994 | Weldy |
| 5,392,447 A | 2/1995 | Schlack et al. |
| 5,412,720 A | 5/1995 | Hoarty |
| 5,418,549 A | 5/1995 | Anderson et al. |
| 5,438,518 A | 8/1995 | Bianco et al. |
| 5,442,771 A | 8/1995 | Filepp et al. |
| 5,446,919 A | 8/1995 | Wilkins |
| 5,469,553 A | 11/1995 | Patrick |
| 5,481,741 A | 1/1996 | McKaskle et al. |
| 5,483,466 A | 1/1996 | Kawahara et al. |
| 5,491,785 A | 2/1996 | Robson et al. |
| 5,499,340 A | 3/1996 | Barritz |
| 5,500,890 A | 3/1996 | Rogge et al. |
| 5,515,098 A | 5/1996 | Carles |
| 5,515,270 A | 5/1996 | Weinblatt |
| 5,515,490 A | 5/1996 | Buchanan et al. |
| 5,517,612 A | 5/1996 | Dwin et al. |
| 5,524,195 A | 6/1996 | Clanton, III et al. |
| 5,524,197 A | 6/1996 | Uya et al. |
| 5,530,472 A | 6/1996 | Bregman et al. |
| 5,530,759 A | 6/1996 | Braudaway et al. |
| 5,530,852 A | 6/1996 | Meske et al. |
| 5,532,735 A | 7/1996 | Blahut et al. |
| 5,541,986 A | 7/1996 | Hou |
| 5,544,302 A | 8/1996 | Nguyen |
| 5,544,320 A | 8/1996 | Konrad |
| 5,548,745 A | 8/1996 | Egan et al. |
| 5,563,804 A | 10/1996 | Mortensen et al. |
| 5,564,043 A | 10/1996 | Siefert |
| 5,572,643 A | 11/1996 | Judson |
| 5,579,381 A | 11/1996 | Courville et al. |
| 5,583,560 A | 12/1996 | Florin et al. |
| 5,583,763 A | 12/1996 | Atcheson et al. |
| 5,584,025 A | 12/1996 | Keithley et al. |
| 5,590,046 A | 12/1996 | Anderson et al. |
| 5,594,509 A | 1/1997 | Florin et al. |
| 5,594,779 A | 1/1997 | Goodman |
| 5,596,718 A | 1/1997 | Boebert et al. |
| 5,602,905 A | 2/1997 | Mettke |
| 5,604,542 A | 2/1997 | Dedrick |
| 5,606,359 A | 2/1997 | Youden et al. |
| 5,608,850 A | 3/1997 | Robertson |
| 5,615,131 A | 3/1997 | Mortensen et al. |
| 5,615,325 A | 3/1997 | Peden |
| 5,617,526 A | 4/1997 | Oran et al. |
| 5,621,456 A | 4/1997 | Florin et al. |
| 5,627,886 A | 5/1997 | Bowman |
| 5,629,978 A | 5/1997 | Blumhardt et al. |
| 5,630,081 A | 5/1997 | Rybicki et al. |
| 5,635,979 A | 6/1997 | Kostreski et al. |
| 5,638,443 A | 6/1997 | Stefik et al. |
| 5,642,484 A | 6/1997 | Harrison, III et al. |
| 5,649,186 A | 7/1997 | Ferguson |
| 5,657,450 A | 8/1997 | Rao et al. |
| 5,664,948 A | 9/1997 | Dimitriadis et al. |
| 5,673,322 A | 9/1997 | Pepe et al. |
| 5,675,510 A | 10/1997 | Coffey et al. |
| 5,680,562 A | 10/1997 | Conrad et al. |
| 5,682,525 A | 10/1997 | Bouve et al. |
| 5,684,715 A | 11/1997 | Palmer |
| 5,684,969 A | 11/1997 | Ishida |
| 5,701,451 A | 12/1997 | Rogers et al. |
| 5,704,017 A | 12/1997 | Heckerman et al. |
| 5,706,434 A | 1/1998 | Kremen et al. |
| 5,706,502 A | 1/1998 | Foley et al. |
| 5,708,709 A | 1/1998 | Rose |
| 5,708,780 A | 1/1998 | Levergood et al. |
| 5,710,884 A | 1/1998 | Dedrick |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,721,827 A | 2/1998 | Logan et al. |
| 5,721,908 A | 2/1998 | Lagarde et al. |
| 5,724,521 A | 3/1998 | Dedrick |
| 5,724,556 A | 3/1998 | Souder et al. |
| 5,724,567 A | 3/1998 | Rose et al. |
| 5,727,129 A | 3/1998 | Barrett et al. |
| 5,727,159 A | 3/1998 | Kikinis |
| 5,734,863 A | 3/1998 | Kodosky et al. |
| 5,737,619 A | 4/1998 | Judson |
| 5,737,739 A | 4/1998 | Shirley et al. |
| 5,740,252 A | 4/1998 | Minor et al. |
| 5,740,549 A | 4/1998 | Reilly et al. |
| 5,742,768 A | 4/1998 | Gennaro et al. |
| 5,742,905 A | 4/1998 | Pepe et al. |
| 5,745,681 A | 4/1998 | Levine et al. |
| 5,751,956 A | 5/1998 | Kirsch |
| 5,754,830 A | 5/1998 | Butts et al. |
| 5,754,938 A | 5/1998 | Herz et al. |
| 5,754,939 A | 5/1998 | Herz et al. |
| 5,758,111 A | 5/1998 | Shiratori et al. |
| 5,758,257 A | 5/1998 | Herz et al. |
| 5,760,767 A | 6/1998 | Shore et al. |
| 5,761,601 A | 6/1998 | Nemirofsky et al. |
| 5,761,662 A | 6/1998 | Dasan |
| 5,768,508 A | 6/1998 | Eikeland |
| 5,768,510 A | 6/1998 | Gish |
| 5,781,894 A | 7/1998 | Petrecca et al. |
| 5,787,253 A | 7/1998 | McCreery et al. |
| 5,787,254 A | 7/1998 | Maddalozzo, Jr. et al. |
| 5,793,972 A | 8/1998 | Shane |
| 5,794,210 A | 8/1998 | Goldhaber et al. |
| 5,794,259 A | 8/1998 | Kikinis |
| 5,796,952 A | 8/1998 | Davis et al. |
| 5,801,685 A | 9/1998 | Miller et al. |
| 5,802,320 A | 9/1998 | Baehr et al. |
| 5,805,735 A | 9/1998 | Chen et al. |
| 5,805,815 A | 9/1998 | Hill |
| 5,809,242 A | 9/1998 | Shaw et al. |
| 5,809,481 A | 9/1998 | Baron et al. |
| 5,809,512 A | 9/1998 | Kato |
| 5,812,642 A | 9/1998 | Leroy |
| 5,812,769 A | 9/1998 | Graber et al. |
| 5,819,047 A | 10/1998 | Bauer et al. |
| 5,819,092 A | 10/1998 | Ferguson et al. |
| 5,822,526 A | 10/1998 | Waskiewicz |
| 5,832,502 A | 11/1998 | Durham et al. |
| 5,835,087 A | 11/1998 | Herz et al. |
| 5,835,092 A | 11/1998 | Boudreau et al. |

| | | | | | | |
|---|---|---|---|---|---|---|
| 5,835,722 A | 11/1998 | Bradshaw et al. | | 5,978,807 A | 11/1999 | Mano et al. |
| 5,838,458 A | 11/1998 | Tsai | | 5,978,833 A | 11/1999 | Pashley et al. |
| 5,848,246 A | 12/1998 | Gish | | 5,978,836 A | 11/1999 | Ouchi |
| 5,848,396 A | 12/1998 | Gerace | | 5,978,841 A | 11/1999 | Berger |
| 5,848,397 A | 12/1998 | Marsh et al. | | 5,978,842 A | 11/1999 | Noble et al. |
| 5,850,352 A | 12/1998 | Moezzi et al. | | 5,983,227 A | 11/1999 | Nazem et al. |
| 5,850,433 A | 12/1998 | Rondeua | | 5,983,244 A | 11/1999 | Nation |
| 5,854,897 A | 12/1998 | Radziewicz et al. | | 5,983,268 A | 11/1999 | Freivald et al. |
| 5,855,008 A | 12/1998 | Goldhaber et al. | | 5,987,466 A | 11/1999 | Greer et al. |
| 5,861,880 A | 1/1999 | Shimizu et al. | | 5,987,606 A | 11/1999 | Cirasole et al. |
| 5,861,883 A | 1/1999 | Cuomo et al. | | 5,991,735 A | 11/1999 | Gerace |
| 5,862,260 A | 1/1999 | Rhoads | | 5,991,799 A | 11/1999 | Yen et al. |
| 5,862,325 A | 1/1999 | Reed et al. | | 5,995,597 A | 11/1999 | Woltz et al. |
| 5,864,823 A | 1/1999 | Levitan | | 5,995,943 A | 11/1999 | Bull et al. |
| 5,870,769 A | 2/1999 | Freund | | 5,996,007 A | 11/1999 | Klug et al. |
| 5,872,850 A | 2/1999 | Klein et al. | | 5,996,011 A | 11/1999 | Humes |
| 5,875,296 A | 2/1999 | Shi et al. | | 5,999,526 A | 12/1999 | Garland et al. |
| 5,877,766 A | 3/1999 | Bates et al. | | 5,999,731 A | 12/1999 | Yellin et al. |
| 5,878,231 A | 3/1999 | Baehr et al. | | 5,999,740 A | 12/1999 | Rowley |
| 5,883,955 A | 3/1999 | Ronning | | 5,999,912 A | 12/1999 | Wodarz et al. |
| 5,884,025 A | 3/1999 | Baehr et al. | | 6,002,401 A | 12/1999 | Baker |
| 5,886,683 A | 3/1999 | Tognazzini et al. | | 6,006,241 A | 12/1999 | Purnaveja et al. |
| 5,887,133 A | 3/1999 | Brown et al. | | 6,006,252 A | 12/1999 | Wolfe |
| 5,890,152 A | 3/1999 | Rapaport et al. | | 6,006,265 A | 12/1999 | Rangan et al. |
| 5,892,917 A | 4/1999 | Myerson | | 6,009,236 A | 12/1999 | Mishima et al. |
| 5,893,053 A | 4/1999 | Trueblood | | 6,009,409 A | 12/1999 | Adler et al. |
| 5,893,118 A | 4/1999 | Sonderegger | | 6,009,410 A | 12/1999 | LeMole et al. |
| 5,894,554 A | 4/1999 | Lowery et al. | | 6,011,537 A | 1/2000 | Slotznick |
| 5,897,622 A | 4/1999 | Blinn et al. | | 6,012,083 A | 1/2000 | Savitzky et al. |
| 5,898,434 A | 4/1999 | Small et al. | | 6,014,502 A | 1/2000 | Moraes |
| 5,901,287 A | 5/1999 | Bull et al. | | 6,014,638 A | 1/2000 | Burge et al. |
| 5,903,892 A | 5/1999 | Hoffert et al. | | 6,014,698 A | 1/2000 | Griffiths |
| 5,905,492 A | 5/1999 | Straub et al. | | 6,014,711 A | 1/2000 | Brown |
| 5,905,800 A | 5/1999 | Moskowitz et al. | | 6,016,509 A | 1/2000 | Dedrick |
| 5,907,838 A | 5/1999 | Miyasaka et al. | | 6,020,884 A | 2/2000 | MacNaughton et al. |
| 5,913,040 A | 6/1999 | Rakavy et al. | | 6,023,726 A | 2/2000 | Saksena |
| 5,918,012 A | 6/1999 | Astiz et al. | | 6,025,837 A | 2/2000 | Matthew, III et al. |
| 5,918,013 A | 6/1999 | Mighdoll et al. | | 6,025,886 A | 2/2000 | Koda |
| 5,918,014 A | 6/1999 | Robinson | | 6,026,368 A | 2/2000 | Brown et al. |
| 5,918,214 A | 6/1999 | Perkowski | | 6,026,413 A | 2/2000 | Challenger et al. |
| 5,920,697 A | 7/1999 | Masters et al. | | 6,026,433 A | 2/2000 | D'arlach et al. |
| 5,923,845 A | 7/1999 | Kamiya et al. | | 6,026,933 A | 2/2000 | King et al. |
| 5,923,853 A | 7/1999 | Danneels | | 6,029,045 A | 2/2000 | Picco et al. |
| 5,929,850 A | 7/1999 | Broadwin et al. | | 6,029,141 A | 2/2000 | Bezos et al. |
| 5,930,446 A | 7/1999 | Kanda | | 6,029,145 A | 2/2000 | Barritz |
| 5,930,700 A | 7/1999 | Pepper et al. | | 6,029,182 A | 2/2000 | Nehab et al. |
| 5,930,801 A | 7/1999 | Falkenhainer et al. | | 6,029,195 A | 2/2000 | Herz |
| 5,931,901 A | 8/1999 | Wolfe et al. | | 6,035,332 A | 3/2000 | Ingrassia, Jr. et al. |
| 5,931,907 A | 8/1999 | Davies et al. | | 6,047,318 A | 4/2000 | Becker et al. |
| 5,933,811 A | 8/1999 | Angles et al. | | 6,047,327 A | 4/2000 | Tso et al. |
| 5,933,832 A | 8/1999 | Suzuoka et al. | | 6,049,821 A | 4/2000 | Theriault et al. |
| 5,936,679 A | 8/1999 | Kasahara et al. | | 6,052,709 A | 4/2000 | Paul |
| 5,937,037 A | 8/1999 | Kamel et al. | | 6,052,717 A | 4/2000 | Reynolds et al. |
| 5,937,390 A | 8/1999 | Hyodo | | 6,052,730 A | 4/2000 | Felciano et al. |
| 5,937,392 A | 8/1999 | Alberts | | 6,055,572 A | 4/2000 | Saksena |
| 5,937,411 A | 8/1999 | Becker | | 6,055,573 A * | 4/2000 | Gardenswartz et al. ...... 709/224 |
| 5,943,478 A | 8/1999 | Aggarwal et al. | | 6,058,141 A | 5/2000 | Barger et al. |
| 5,944,791 A | 8/1999 | Scherpbier | | 6,061,054 A | 5/2000 | Jolly |
| 5,946,646 A | 8/1999 | Schena et al. | | 6,061,659 A | 5/2000 | Murray |
| 5,946,664 A | 8/1999 | Ebisawa | | 6,061,716 A | 5/2000 | Moncreiff |
| 5,946,697 A | 8/1999 | Shen | | 6,065,024 A | 5/2000 | Renshaw |
| 5,948,061 A | 9/1999 | Merriman et al. | | 6,065,056 A | 5/2000 | Bradshaw et al. |
| 5,951,300 A | 9/1999 | Brown | | 6,067,559 A | 5/2000 | Allard et al. |
| 5,956,693 A | 9/1999 | Geerlings | | 6,067,561 A | 5/2000 | Dillon |
| 5,956,716 A | 9/1999 | Kenner et al. | | 6,067,565 A | 5/2000 | Horvitz |
| 5,958,008 A | 9/1999 | Pogrebisky et al. | | 6,070,140 A | 5/2000 | Tran |
| 5,958,015 A | 9/1999 | Dascalu | | 6,073,105 A | 6/2000 | Sutcliffe et al. |
| 5,959,621 A | 9/1999 | Nawaz et al. | | 6,073,167 A | 6/2000 | Poulton et al. |
| 5,959,623 A | 9/1999 | Van Hoff et al. | | 6,073,241 A | 6/2000 | Rosenberg et al. |
| 5,960,409 A | 9/1999 | Wexler | | 6,076,166 A | 6/2000 | Moshfeghi et al. |
| 5,961,593 A | 10/1999 | Gabber et al. | | 6,078,916 A | 6/2000 | Culliss |
| 5,961,602 A | 10/1999 | Thompson et al. | | 6,081,840 A | 6/2000 | Zhao |
| 5,961,603 A | 10/1999 | Kunkel et al. | | 6,084,581 A | 7/2000 | Hunt |
| 5,963,909 A | 10/1999 | Warren et al. | | 6,085,193 A | 7/2000 | Malkin et al. |
| 5,963,915 A | 10/1999 | Kirsch | | 6,085,226 A | 7/2000 | Horvitz |
| 5,966,121 A | 10/1999 | Hubbell et al. | | 6,085,242 A | 7/2000 | Chandra |
| 5,970,473 A | 10/1999 | Gersber et al. | | 6,088,731 A | 7/2000 | Kiraly et al. |
| 5,974,219 A | 10/1999 | Fujita et al. | | 6,091,411 A | 7/2000 | Straub et al. |
| 5,974,451 A | 10/1999 | Simmons | | 6,092,196 A | 7/2000 | Reiche |

| Patent | Type | Date | Inventor |
|---|---|---|---|
| 6,094,655 | A | 7/2000 | Rogers et al. |
| 6,094,677 | A | 7/2000 | Capek et al. |
| 6,098,064 | A | 8/2000 | Pirolli et al. |
| 6,098,065 | A | 8/2000 | Skillen et al. |
| 6,101,510 | A | 8/2000 | Stone et al. |
| 6,108,637 | A | 8/2000 | Blumenau |
| 6,108,691 | A | 8/2000 | Lee et al. |
| 6,108,799 | A | 8/2000 | Boulay et al. |
| 6,112,215 | A | 8/2000 | Kaply |
| 6,112,246 | A | 8/2000 | Horbal et al. |
| 6,115,680 | A | 9/2000 | Coffee et al. |
| 6,119,098 | A | 9/2000 | Guyot et al. |
| 6,119,165 | A | 9/2000 | Li et al. |
| 6,122,632 | A | 9/2000 | Botts et al. |
| 6,125,388 | A | 9/2000 | Reisman |
| 6,128,655 | A | 10/2000 | Fields et al. |
| 6,128,663 | A | 10/2000 | Thomas |
| 6,133,912 | A | 10/2000 | Montero |
| 6,133,918 | A | 10/2000 | Conrad et al. |
| 6,134,380 | A | 10/2000 | Kushizaki |
| 6,134,532 | A | 10/2000 | Lazarus et al. |
| 6,138,146 | A | 10/2000 | Moon et al. |
| 6,138,155 | A | 10/2000 | Davis et al. |
| 6,141,010 | A | 10/2000 | Hoyle |
| 6,144,944 | A | 11/2000 | Kurtzman, II et al. |
| 6,151,596 | A | 11/2000 | Hosomi |
| 6,154,738 | A | 11/2000 | Call |
| 6,154,771 | A | 11/2000 | Rangan et al. |
| 6,157,924 | A | 12/2000 | Austin |
| 6,157,946 | A | 12/2000 | Itakura et al. |
| 6,161,112 | A | 12/2000 | Cragun et al. |
| 6,163,778 | A | 12/2000 | Fogg et al. |
| 6,167,438 | A | 12/2000 | Yates et al. |
| 6,167,453 | A | 12/2000 | Becker et al. |
| 6,178,443 | B1 | 1/2001 | Lin |
| 6,178,461 | B1 | 1/2001 | Chan et al. |
| 6,182,066 | B1 | 1/2001 | Marques |
| 6,182,097 | B1 | 1/2001 | Hansen et al. |
| 6,182,122 | B1 | 1/2001 | Berstis |
| 6,182,133 | B1 | 1/2001 | Horvitz |
| 6,183,366 | B1 | 2/2001 | Goldberg et al. |
| 6,185,558 | B1 | 2/2001 | Bowman |
| 6,185,586 | B1 | 2/2001 | Judson |
| 6,185,614 | B1 | 2/2001 | Cuomo et al. |
| 6,191,782 | B1 | 2/2001 | Mori et al. |
| 6,192,380 | B1 | 2/2001 | Light et al. |
| 6,195,622 | B1 | 2/2001 | Altschuler et al. |
| 6,198,906 | B1 | 3/2001 | Boetje et al. |
| 6,199,079 | B1 | 3/2001 | Gupta et al. |
| 6,202,093 | B1 | 3/2001 | Bolam et al. |
| 6,204,840 | B1 | 3/2001 | Petelcyky et al. |
| 6,208,339 | B1 | 3/2001 | Atlas et al. |
| 6,216,141 | B1 | 4/2001 | Straub et al. |
| 6,216,212 | B1 | 4/2001 | Challenger et al. |
| 6,219,676 | B1 | 4/2001 | Reiner |
| 6,222,520 | B1 | 4/2001 | Gerszberg et al. |
| 6,223,215 | B1 | 4/2001 | Hunt et al. |
| 6,233,564 | B1 | 5/2001 | Schulze, Jr. |
| 6,237,022 | B1 | 5/2001 | Bruck et al. |
| 6,249,284 | B1 | 6/2001 | Bogdan |
| 6,253,188 | B1 | 6/2001 | Witek et al. |
| 6,253,208 | B1 | 6/2001 | Wittgreffe et al. |
| 6,266,058 | B1 | 7/2001 | Meyer |
| 6,269,361 | B1 | 7/2001 | Davis et al. |
| 6,275,854 | B1 | 8/2001 | Himmel et al. |
| 6,279,112 | B1 | 8/2001 | O'Toole et al. |
| 6,280,043 | B1 | 8/2001 | Ohkawa |
| 6,285,987 | B1 | 9/2001 | Roth et al. |
| 6,286,043 | B1 | 9/2001 | Cuomo et al. |
| 6,286,045 | B1 | 9/2001 | Griffiths et al. |
| 6,295,061 | B1 | 9/2001 | Park et al. |
| 6,297,819 | B1 | 10/2001 | Furst |
| 6,304,844 | B1 | 10/2001 | Pan et al. |
| 6,308,202 | B1 | 10/2001 | Cohn et al. |
| 6,311,194 | B1 | 10/2001 | Sheth et al. |
| 6,314,451 | B1 | 11/2001 | Landsman et al. |
| 6,314,457 | B1 | 11/2001 | Schema et al. |
| 6,317,761 | B1 | 11/2001 | Landsman et al. |
| 6,321,209 | B1 | 11/2001 | Pasquali |
| 6,321,256 | B1 | 11/2001 | Himmel et al. |
| 6,324,553 | B1 | 11/2001 | Cragun et al. |
| 6,324,569 | B1 | 11/2001 | Ogilvie et al. |
| 6,324,583 | B1 | 11/2001 | Stevens |
| 6,327,574 | B1 | 12/2001 | Kramer et al. |
| 6,327,617 | B1 | 12/2001 | Fawcett |
| 6,332,127 | B1 | 12/2001 | Bandera |
| 6,334,111 | B1 | 12/2001 | Carrott |
| 6,335,963 | B1 | 1/2002 | Bosco |
| 6,336,131 | B1 | 1/2002 | Wolfe |
| 6,338,059 | B1 | 1/2002 | Fields et al. |
| 6,338,066 | B1 | 1/2002 | Martin et al. |
| 6,341,305 | B2 | 1/2002 | Wolfe |
| 6,347,398 | B1 | 2/2002 | Parthasarathy et al. |
| 6,351,279 | B1 | 2/2002 | Sawyer |
| 6,351,745 | B1 | 2/2002 | Itakura et al. |
| 6,353,834 | B1 | 3/2002 | Wong et al. |
| 6,356,898 | B2 | 3/2002 | Cohen et al. |
| 6,356,908 | B1 | 3/2002 | Brown et al. |
| 6,360,221 | B1 | 3/2002 | Gough et al. |
| 6,366,298 | B1 | 4/2002 | Haitsuka |
| 6,370,527 | B1 | 4/2002 | Singhal |
| 6,377,983 | B1 | 4/2002 | Cohen et al. |
| 6,378,075 | B1 | 4/2002 | Goldstein et al. |
| 6,381,735 | B1 | 4/2002 | Hunt |
| 6,381,742 | B2 | 4/2002 | Forbes et al. |
| 6,385,592 | B1 | 5/2002 | Angles et al. |
| 6,392,668 | B1 | 5/2002 | Murray |
| 6,393,407 | B1 | 5/2002 | Middleton et al. |
| 6,393,415 | B1 | 5/2002 | Getchius et al. |
| 6,397,228 | B1 | 5/2002 | Lamburt et al. |
| 6,401,075 | B1 | 6/2002 | Mason et al. |
| 6,415,322 | B1 | 7/2002 | Jaye |
| 6,418,440 | B1 | 7/2002 | Kuo et al. |
| 6,418,471 | B1 | 7/2002 | Shelton et al. |
| 6,421,675 | B1 | 7/2002 | Ryan et al. |
| 6,421,724 | B1 | 7/2002 | Nickerson et al. |
| 6,421,729 | B1 | 7/2002 | Paltenghe et al. |
| 6,434,745 | B1 | 8/2002 | Conley, Jr. et al. |
| 6,437,802 | B1 | 8/2002 | Kenny |
| 6,438,215 | B1 | 8/2002 | Skladman et al. |
| 6,438,578 | B1 | 8/2002 | Schmid et al. |
| 6,438,579 | B1 | 8/2002 | Hosken |
| 6,441,832 | B1 | 8/2002 | Tao et al. |
| 6,442,529 | B1 | 8/2002 | Krishan et al. |
| 6,446,128 | B1 | 9/2002 | Woods et al. |
| 6,449,657 | B2 | 9/2002 | Stanbach, Jr. et al. |
| 6,452,612 | B1 | 9/2002 | Holtz et al. |
| 6,457,009 | B1 | 9/2002 | Bollay |
| 6,459,440 | B1 | 10/2002 | Monnes et al. |
| 6,460,036 | B1 | 10/2002 | Herz |
| 6,460,042 | B1 | 10/2002 | Hitchcock et al. |
| 6,460,060 | B1 | 10/2002 | Maddalozzo et al. |
| 6,466,970 | B1 | 10/2002 | Lee et al. |
| 6,477,550 | B1 | 11/2002 | Balasubramaniam et al. |
| 6,477,575 | B1 | 11/2002 | Koeppel et al. |
| 6,480,837 | B1 | 11/2002 | Dutta |
| 6,484,148 | B1 | 11/2002 | Boyd |
| 6,487,538 | B1 | 11/2002 | Gupta et al. |
| 6,490,722 | B1 | 12/2002 | Barton et al. |
| 6,493,702 | B1 | 12/2002 | Adar et al. |
| 6,496,931 | B1 | 12/2002 | Rajchel et al. |
| 6,499,052 | B1 | 12/2002 | Hoang et al. |
| 6,502,076 | B1 | 12/2002 | Smith |
| 6,505,201 | B1 | 1/2003 | Haitsuka |
| 6,513,052 | B1 | 1/2003 | Binder |
| 6,513,060 | B1 | 1/2003 | Nixon et al. |
| 6,516,312 | B1 | 2/2003 | Kraft et al. |
| 6,523,021 | B1 | 2/2003 | Monberg et al. |
| 6,526,411 | B1 | 2/2003 | Ward |
| 6,529,903 | B2 | 3/2003 | Smith et al. |
| 6,539,375 | B2 | 3/2003 | Kawasaki |
| 6,539,424 | B1 | 3/2003 | Dutta |
| 6,564,202 | B1 | 5/2003 | Schuetze et al. |
| 6,567,850 | B1 | 5/2003 | Freishtat et al. |
| 6,567,854 | B1 | 5/2003 | Olshansky et al. |
| 6,570,595 | B2 | 5/2003 | Porter |
| 6,572,662 | B2 | 6/2003 | Manohar et al. |
| 6,584,479 | B2 | 6/2003 | Chang et al. |

| Patent | Date | Inventor |
|---|---|---|
| 6,584,492 B1 | 6/2003 | Cezar et al. |
| 6,584,505 B1 | 6/2003 | Howard et al. |
| 6,594,654 B1 | 7/2003 | Salam et al. |
| 6,601,041 B1 | 7/2003 | Brown et al. |
| 6,601,057 B1 | 7/2003 | Underwood et al. |
| 6,601,100 B2 | 7/2003 | Lee et al. |
| 6,604,103 B1 | 8/2003 | Wolfe |
| 6,606,652 B1 | 8/2003 | Cohn et al. |
| 6,615,247 B1 | 9/2003 | Murphy |
| 6,622,168 B1 | 9/2003 | Datta |
| 6,631,360 B1 | 10/2003 | Cook |
| 6,642,944 B2 | 11/2003 | Conrad et al. |
| 6,643,696 B2 | 11/2003 | Davis et al. |
| 6,665,656 B1 | 12/2003 | Carter |
| 6,665,838 B1 | 12/2003 | Brown et al. |
| 6,678,731 B1 | 1/2004 | Howard et al. |
| 6,678,866 B1 | 1/2004 | Sugimoto et al. |
| 6,681,223 B1 | 1/2004 | Sundaresan |
| 6,681,247 B1 | 1/2004 | Payton |
| 6,686,931 B1 | 2/2004 | Bodnar |
| 6,687,737 B2 | 2/2004 | Landsman et al. |
| 6,691,106 B1 | 2/2004 | Sathyanarayan |
| 6,697,825 B1 | 2/2004 | Underwood et al. |
| 6,701,362 B1 | 3/2004 | Subramonian |
| 6,701,363 B1 | 3/2004 | Chiu et al. |
| 6,714,975 B1 | 3/2004 | Aggarwal et al. |
| 6,718,365 B1 | 4/2004 | Dutta |
| 6,721,741 B1 | 4/2004 | Eyal et al. |
| 6,721,795 B1 | 4/2004 | Eldreth |
| 6,725,269 B1 | 4/2004 | Megiddo |
| 6,725,303 B1 | 4/2004 | Hoguta et al. |
| 6,741,967 B1 | 5/2004 | Wu et al. |
| 6,757,661 B1 | 6/2004 | Blaser et al. |
| 6,760,746 B1 | 7/2004 | Schneider |
| 6,760,916 B2 | 7/2004 | Holtz et al. |
| 6,763,379 B1 | 7/2004 | Shuster |
| 6,763,386 B2 | 7/2004 | Davis et al. |
| 6,771,290 B1 | 8/2004 | Hoyle |
| 6,772,200 B1 | 8/2004 | Bakshi et al. |
| 6,785,659 B1 | 8/2004 | Landsman et al. |
| 6,785,723 B1 | 8/2004 | Genty et al. |
| 6,801,906 B1 | 10/2004 | Bates et al. |
| 6,801,909 B2 | 10/2004 | Delgado et al. |
| 6,826,534 B1 | 11/2004 | Gupta et al. |
| 6,826,546 B1 | 11/2004 | Shuster |
| 6,827,669 B2 | 12/2004 | Cohen et al. |
| 6,847,969 B1 | 1/2005 | Mathai et al. |
| 6,848,004 B1 | 1/2005 | Chang et al. |
| 6,850,967 B1 | 2/2005 | Spencer et al. |
| 6,853,982 B2 | 2/2005 | Smith et al. |
| 6,857,024 B1 | 2/2005 | Chen et al. |
| 6,874,018 B2 | 3/2005 | Wu |
| 6,877,027 B1 | 4/2005 | Spencer et al. |
| 6,880,123 B1 | 4/2005 | Landsman |
| 6,882,981 B2 | 4/2005 | Philippe et al. |
| 6,892,181 B1 | 5/2005 | Megiddo et al. |
| 6,892,223 B1 | 5/2005 | Kawabata et al. |
| 6,892,226 B1 | 5/2005 | Tso et al. |
| 6,892,354 B1 | 5/2005 | Servan-Schreiber et al. |
| 6,904,408 B1 | 6/2005 | McCarthy et al. |
| 6,910,179 B1 | 6/2005 | Pennell et al. |
| 6,934,736 B2 | 8/2005 | Sears et al. |
| 6,938,027 B1 | 8/2005 | Barritz |
| 6,957,390 B2 | 10/2005 | Tamir et al. |
| 6,958,759 B2 | 10/2005 | Safadi et al. |
| 6,968,507 B2 | 11/2005 | Pennell et al. |
| 6,973,478 B1 | 12/2005 | Ketonen et al. |
| 6,976,053 B1 | 12/2005 | Tripp et al. |
| 6,976,090 B2 | 12/2005 | Ben-Shaul et al. |
| 6,990,633 B1 | 1/2006 | Miyasaka |
| 6,993,532 B1 | 1/2006 | Platt et al. |
| 7,003,734 B1 | 2/2006 | Gardner et al. |
| 7,016,887 B2 | 3/2006 | Stockfisch |
| 7,039,599 B2 | 5/2006 | Merriman et al. |
| 7,043,526 B1 | 5/2006 | Wolfe |
| 7,051,084 B1 | 5/2006 | Hayton et al. |
| 7,054,900 B1 | 5/2006 | Goldston |
| 7,065,550 B2 | 6/2006 | Raghunandan |
| 7,069,515 B1 | 6/2006 | Eagle et al. |
| 7,076,546 B1 | 7/2006 | Bates et al. |
| 7,085,682 B1 | 8/2006 | Heller et al. |
| 7,100,111 B2 | 8/2006 | McElfresh et al. |
| 7,133,924 B1 | 11/2006 | Rosenberg et al. |
| 7,136,875 B2 | 11/2006 | Anderson et al. |
| 7,149,791 B2 | 12/2006 | Sears et al. |
| 7,155,729 B1 | 12/2006 | Andrew et al. |
| 7,162,739 B2 | 1/2007 | Cowden et al. |
| 7,181,415 B2 | 2/2007 | Blaser et al. |
| 7,181,488 B2 | 2/2007 | Martin et al. |
| 7,194,425 B2 | 3/2007 | Nyhan |
| 7,254,547 B1 | 8/2007 | Beck et al. |
| 7,283,992 B2 | 10/2007 | Liu et al. |
| 7,346,606 B2 | 3/2008 | Bharat |
| 7,349,827 B1 | 3/2008 | Heller et al. |
| 7,363,291 B1 | 4/2008 | Page |
| 7,421,432 B1 | 9/2008 | Hoelzle et al. |
| 7,424,708 B2 | 9/2008 | Andersson et al. |
| 7,451,065 B2 | 11/2008 | Pednault et al. |
| 7,454,364 B2 | 11/2008 | Shkedi |
| 7,464,155 B2 | 12/2008 | Mousavi et al. |
| 7,512,603 B1 | 3/2009 | Veteska et al. |
| 7,630,986 B1 | 12/2009 | Herz |
| 7,743,340 B2 | 6/2010 | Horvitz et al. |
| 7,844,488 B2 | 11/2010 | Merriman et al. |
| 2001/0011226 A1 | 8/2001 | Greer et al. |
| 2001/0029527 A1 | 10/2001 | Goshen |
| 2001/0030970 A1 | 10/2001 | Wiryaman et al. |
| 2001/0032115 A1 | 10/2001 | Goldstein |
| 2001/0037240 A1 | 11/2001 | Marks et al. |
| 2001/0037325 A1 | 11/2001 | Biderman et al. |
| 2001/0037488 A1 | 11/2001 | Lee |
| 2001/0044795 A1 | 11/2001 | Cohen et al. |
| 2001/0047354 A1 | 11/2001 | Davis et al. |
| 2001/0049320 A1 | 12/2001 | Cohen et al. |
| 2001/0049321 A1 | 12/2001 | Cohen et al. |
| 2001/0049620 A1 | 12/2001 | Blasko |
| 2001/0049716 A1 | 12/2001 | Wolfe |
| 2001/0051559 A1 | 12/2001 | Cohen et al. |
| 2001/0053735 A1 | 12/2001 | Cohen et al. |
| 2001/0054020 A1 | 12/2001 | Barth et al. |
| 2002/0002483 A1 | 1/2002 | Siegel et al. |
| 2002/0002538 A1 | 1/2002 | Ling |
| 2002/0004754 A1 | 1/2002 | Gardenswartz |
| 2002/0007307 A1 | 1/2002 | Miller |
| 2002/0007309 A1 | 1/2002 | Reynar |
| 2002/0007317 A1 | 1/2002 | Callaghan et al. |
| 2002/0008703 A1 | 1/2002 | Merrill et al. |
| 2002/0010626 A1 | 1/2002 | Agmoni |
| 2002/0010757 A1 | 1/2002 | Granik et al. |
| 2002/0010776 A1 | 1/2002 | Lerner |
| 2002/0016736 A1 | 2/2002 | Cannon et al. |
| 2002/0019763 A1 | 2/2002 | Linden et al. |
| 2002/0019834 A1 | 2/2002 | Vilcauskas, Jr. et al. |
| 2002/0023159 A1 | 2/2002 | Vange et al. |
| 2002/0026390 A1 | 2/2002 | Ulenas et al. |
| 2002/0032592 A1 | 3/2002 | Krasnick et al. |
| 2002/0035568 A1 | 3/2002 | Benthin |
| 2002/0038363 A1 | 3/2002 | MacLean |
| 2002/0040374 A1 | 4/2002 | Kent |
| 2002/0042750 A1 | 4/2002 | Morrison |
| 2002/0046087 A1* | 4/2002 | Hey ................. 705/14 |
| 2002/0046099 A1 | 4/2002 | Frengut et al. |
| 2002/0049633 A1 | 4/2002 | Pasquali |
| 2002/0052785 A1 | 5/2002 | Tenenbaum |
| 2002/0052925 A1 | 5/2002 | Kim et al. |
| 2002/0053078 A1 | 5/2002 | Holtz et al. |
| 2002/0054089 A1 | 5/2002 | Nicholas |
| 2002/0055912 A1 | 5/2002 | Buck |
| 2002/0057285 A1 | 5/2002 | Nicholas, III |
| 2002/0059094 A1 | 5/2002 | Hosea et al. |
| 2002/0059099 A1 | 5/2002 | Coletta |
| 2002/0065802 A1 | 5/2002 | Uchiyama |
| 2002/0068500 A1 | 6/2002 | Gabai et al. |
| 2002/0069105 A1 | 6/2002 | do Rosario Botelho et al. |
| 2002/0073079 A1 | 6/2002 | Terheggen |
| 2002/0077219 A1 | 6/2002 | Cohen et al. |
| 2002/0078076 A1 | 6/2002 | Evans |
| 2002/0078192 A1 | 6/2002 | Kopsell et al. |

| | | | | | | |
|---|---|---|---|---|---|---|
| 2002/0087499 A1 | 7/2002 | Stockfisch | | 2003/0229542 A1 | 12/2003 | Morrisroe |
| 2002/0087621 A1 | 7/2002 | Hendriks | | 2004/0002896 A1 | 1/2004 | Alanen et al. |
| 2002/0091700 A1 | 7/2002 | Steele et al. | | 2004/0024756 A1 | 2/2004 | Rickard |
| 2002/0091875 A1 | 7/2002 | Fujiwara et al. | | 2004/0030798 A1 | 2/2004 | Anderson et al. |
| 2002/0094868 A1 | 7/2002 | Tuck et al. | | 2004/0044677 A1 | 3/2004 | Huper-Graff et al. |
| 2002/0099605 A1 | 7/2002 | Weitzman et al. | | 2004/0068486 A1 | 4/2004 | Chidlovskii |
| 2002/0099767 A1 | 7/2002 | Cohen et al. | | 2004/0073485 A1 | 4/2004 | Liu et al. |
| 2002/0099812 A1 | 7/2002 | Davis et al. | | 2004/0078294 A1 | 4/2004 | Rollins et al. |
| 2002/0099824 A1 | 7/2002 | Bender et al. | | 2004/0095376 A1 | 5/2004 | Graham et al. |
| 2002/0103811 A1 | 8/2002 | Fankhauser et al. | | 2004/0098229 A1 | 5/2004 | Error et al. |
| 2002/0107847 A1 | 8/2002 | Johnson | | 2004/0098449 A1 | 5/2004 | Bar-Lavi et al. |
| 2002/0107858 A1 | 8/2002 | Lundahl et al. | | 2004/0117353 A1 | 6/2004 | Ishag |
| 2002/0111910 A1 | 8/2002 | Walsh | | 2004/0133845 A1 | 7/2004 | Forstall et al. |
| 2002/0111994 A1 | 8/2002 | Raghunandan | | 2004/0162738 A1 | 8/2004 | Sanders et al. |
| 2002/0112035 A1 | 8/2002 | Carey et al. | | 2004/0162759 A1 | 8/2004 | Willis |
| 2002/0112048 A1 | 8/2002 | Gruyer et al. | | 2004/0163101 A1 | 8/2004 | Swix et al. |
| 2002/0116494 A1 | 8/2002 | Kocol | | 2004/0167928 A1 | 8/2004 | Anderson et al. |
| 2002/0120648 A1 | 8/2002 | Ball et al. | | 2004/0181525 A1 | 9/2004 | Itzhak et al. |
| 2002/0122065 A1 | 9/2002 | Segal et al. | | 2004/0181604 A1 | 9/2004 | Immonen |
| 2002/0123912 A1 | 9/2002 | Subramanian et al. | | 2004/0193488 A1 | 9/2004 | Khoo et al. |
| 2002/0128904 A1 | 9/2002 | Carruthers et al. | | 2004/0210533 A1 | 10/2004 | Picker et al. |
| 2002/0128908 A1 | 9/2002 | Levin et al. | | 2004/0225716 A1 | 11/2004 | Shamir et al. |
| 2002/0128925 A1 | 9/2002 | Angeles | | 2004/0247748 A1 | 12/2004 | Bronkema |
| 2002/0152121 A1 | 10/2002 | Hiroshi | | 2004/0249709 A1 | 12/2004 | Donovan et al. |
| 2002/0152126 A1 | 10/2002 | Lieu et al. | | 2004/0249938 A1 | 12/2004 | Bunch |
| 2002/0152222 A1 | 10/2002 | Holbrook | | 2004/0254810 A1 | 12/2004 | Yamaga et al. |
| 2002/0154163 A1 | 10/2002 | Melchner | | 2004/0267723 A1 | 12/2004 | Bharat |
| 2002/0156781 A1 | 10/2002 | Cordray et al. | | 2005/0015366 A1 | 1/2005 | Carrasco et al. |
| 2002/0156812 A1 | 10/2002 | Krasnoiarov et al. | | 2005/0021397 A1 | 1/2005 | Cui et al. |
| 2002/0169670 A1* | 11/2002 | Barsade et al. ............... 705/14 | | 2005/0027821 A1 | 2/2005 | Alexander et al. |
| 2002/0169762 A1 | 11/2002 | Cardona | | 2005/0027822 A1 | 2/2005 | Plaza |
| 2002/0170068 A1 | 11/2002 | Rafey et al. | | 2005/0033657 A1 | 2/2005 | Herrington et al. |
| 2002/0171682 A1 | 11/2002 | Frank et al. | | 2005/0038819 A1 | 2/2005 | Hicken et al. |
| 2002/0175947 A1 | 11/2002 | Conrad et al. | | 2005/0080772 A1 | 4/2005 | Bem |
| 2002/0194151 A1 | 12/2002 | Fenton et al. | | 2005/0086109 A1 | 4/2005 | McFadden et al. |
| 2002/0198778 A1 | 12/2002 | Landsman et al. | | 2005/0091106 A1 | 4/2005 | Reller et al. |
| 2003/0004804 A1 | 1/2003 | Landsman et al. | | 2005/0091111 A1 | 4/2005 | Green et al. |
| 2003/0005000 A1 | 1/2003 | Landsman et al. | | 2005/0097088 A1 | 5/2005 | Bennett et al. |
| 2003/0005067 A1 | 1/2003 | Martin et al. | | 2005/0102202 A1 | 5/2005 | Linden et al. |
| 2003/0005134 A1 | 1/2003 | Martin et al. | | 2005/0102282 A1 | 5/2005 | Linden |
| 2003/0011639 A1 | 1/2003 | Webb | | 2005/0125382 A1 | 6/2005 | Karnawat et al. |
| 2003/0014304 A1 | 1/2003 | Calvert et al. | | 2005/0131762 A1 | 6/2005 | Bharat et al. |
| 2003/0014399 A1 | 1/2003 | Hansen et al. | | 2005/0132267 A1 | 6/2005 | Aviv |
| 2003/0018778 A1 | 1/2003 | Martin et al. | | 2005/0149404 A1 | 7/2005 | Barnett et al. |
| 2003/0018885 A1 | 1/2003 | Landsman et al. | | 2005/0155031 A1 | 7/2005 | Wang et al. |
| 2003/0023481 A1 | 1/2003 | Calvert et al. | | 2005/0182773 A1 | 8/2005 | Feinsmith |
| 2003/0023488 A1 | 1/2003 | Landsman et al. | | 2005/0187823 A1 | 8/2005 | Howes |
| 2003/0023698 A1 | 1/2003 | Dieberger et al. | | 2005/0203796 A1 | 9/2005 | Anand et al. |
| 2003/0028529 A1 | 2/2003 | Cheung et al. | | 2005/0204148 A1 | 9/2005 | Mayo |
| 2003/0028565 A1 | 2/2003 | Landsman et al. | | 2005/0216572 A1 | 9/2005 | Tso et al. |
| 2003/0028870 A1 | 2/2003 | Weisman et al. | | 2005/0222901 A1 | 10/2005 | Agarwal et al. |
| 2003/0032409 A1 | 2/2003 | Hutcheson et al. | | 2005/0222982 A1 | 10/2005 | Paczkowski et al. |
| 2003/0033155 A1 | 2/2003 | Peerson et al. | | 2005/0240599 A1 | 10/2005 | Sears |
| 2003/0040958 A1 | 2/2003 | Fernandes | | 2005/0273463 A1 | 12/2005 | Zohar et al. |
| 2003/0041050 A1 | 2/2003 | Smith et al. | | 2005/0289120 A9 | 12/2005 | Soulanille et al. |
| 2003/0046150 A1 | 3/2003 | Ader et al. | | 2006/0015390 A1 | 1/2006 | Rijsinghani et al. |
| 2003/0050863 A1 | 3/2003 | Radwin | | 2006/0026233 A1 | 2/2006 | Tenembaum et al. |
| 2003/0052913 A1 | 3/2003 | Barile | | 2006/0031253 A1 | 2/2006 | Newbold et al. |
| 2003/0074448 A1 | 4/2003 | Kinebuchi | | 2006/0053230 A1 | 3/2006 | Montero |
| 2003/0088554 A1 | 5/2003 | Ryan et al. | | 2006/0136524 A1 | 6/2006 | Wohlers et al. |
| 2003/0105589 A1 | 6/2003 | Liu et al. | | 2006/0136528 A1 | 6/2006 | Martin et al. |
| 2003/0110080 A1 | 6/2003 | Tsutani et al. | | 2006/0136728 A1 | 6/2006 | Gentry et al. |
| 2003/0115157 A1 | 6/2003 | Circenis | | 2006/0235965 A1 | 10/2006 | Bennett et al. |
| 2003/0120593 A1 | 6/2003 | Bansal et al. | | 2006/0253432 A1 | 11/2006 | Eagle et al. |
| 2003/0120654 A1 | 6/2003 | Edlund et al. | | 2007/0016469 A1 | 1/2007 | Bae et al. |
| 2003/0131100 A1 | 7/2003 | Godon et al. | | 2007/0038956 A1 | 2/2007 | Morris |
| 2003/0135490 A1 | 7/2003 | Barrett et al. | | | | |
| 2003/0135853 A1 | 7/2003 | Goldman et al. | | FOREIGN PATENT DOCUMENTS | | |
| 2003/0154168 A1 | 8/2003 | Lautenbacher | | EP | 0822535 | 2/1998 |
| 2003/0171990 A1 | 9/2003 | Rao et al. | | EP | 1045547 | 10/2000 |
| 2003/0172075 A1 | 9/2003 | Reisman | | EP | 1154611 | 11/2001 |
| 2003/0176931 A1 | 9/2003 | Pednault et al. | | EP | 1207468 | 5/2002 |
| 2003/0182184 A1 | 9/2003 | Strasnick et al. | | JP | 343825 | 2/1991 |
| 2003/0195837 A1 | 10/2003 | Kostic et al. | | JP | 11066099 | 3/1999 |
| 2003/0195877 A1 | 10/2003 | Ford et al. | | JP | 2001084256 | 3/2001 |
| 2003/0206720 A1 | 11/2003 | Abecassis | | JP | 2001147894 | 5/2001 |
| 2003/0208472 A1 | 11/2003 | Pham | | JP | 20010222535 | 8/2001 |
| 2003/0220091 A1 | 11/2003 | Farrand et al. | | JP | 2001312482 | 11/2001 |
| 2003/0221167 A1 | 11/2003 | Goldstein et al. | | JP | 2002024221 | 1/2002 |

| | | |
|---|---|---|
| JP | 2002032401 | 1/2002 |
| JP | 2002073545 | 3/2002 |
| JP | 2002259371 | 9/2002 |
| JP | 2002334104 | 11/2002 |
| JP | 2003058572 | 2/2003 |
| JP | 2003141155 | 5/2003 |
| JP | 2003178092 | 6/2003 |
| JP | 20030271647 | 9/2003 |
| JP | 2004-355376 | 12/2004 |
| WO | WO 9847090 | 10/1998 |
| WO | WO 99/38321 | 7/1999 |
| WO | WO 99/44159 | 9/1999 |
| WO | WO 99/46701 | 9/1999 |
| WO | WO 99/55066 | 10/1999 |
| WO | WO 99/59097 | 11/1999 |
| WO | WO 00/04434 | 1/2000 |
| WO | WO 00/54201 | 9/2000 |
| WO | WO 01/03028 | 1/2001 |
| WO | WO 01/15052 | 3/2001 |
| WO | WO 01/39024 A2 | 5/2001 |
| WO | WO 01/44992 | 6/2001 |
| WO | WO 01/63472 | 8/2001 |
| WO | WO 01/69929 | 9/2001 |
| WO | WO 01/90917 | 11/2001 |
| WO | WO01/90917 | 11/2001 |
| WO | WO 02/44869 A2 | 6/2002 |
| WO | WO 03/010685 | 2/2003 |

OTHER PUBLICATIONS

International Search Report in PCT Appln. No. PCT/US2004/07714, mailed Mar. 31, 2005 [1 page].
Shopping with WhenUShop, Webpage [on-line]; WhenU.com [retrieved on Mar. 19, 2002]. Retrieved from the Internet: URL:http://www.whenu.com.
SideStep, The Traveler's Search Engine; Webpage (online) (retrieved on Oct. 7, 2004); retrieved from the Internet: <URL:http://www.sidestep.com/main.html.
U.S. Appl. No. 11/210,209—Oct. 16, 2007 Office Action.
U.S. Appl. No. 11/211,197—Jun. 23, 2006 PTO Office Action.
Visual Search ToolBar—Graphically Enhance Search Results, 2004 Viewpoint Corporation; Webpage [online] [retrieved on Oct. 7, 2004]; retrieved from the Internet: <URL:http://www.viewpoint.com/pub/toolbar/download.html.
Written Opinion in PCT Appln. No. PCT/US2004/07714, mailed Mar. 31, 2005 [3 pages].
ACM Portal USPTO Search, "Communications of the ACM: vol. 52, Issue 1", Association for Computing Machinery, dated Jan. 2009, 1 page.
Ad Close, Webpage [online]. C/net Downloads.com [retrieved on Oct. 4, 2001]. Retrieved from the Internet <URL http//download.cnet.com/downloads/0-10059-100-915154.html>.
Ad Muncher, Webpage [online]. C/net Downloads.com [retrieved on Oct. 4, 2001]. Retrieved from the Internet <URL:http//download.cnet.com/downloads/0-33567-18-100-2750044.html>.
AdDelete, Webpage [online]. C/net Download.com [retrieved on Oct. 4, 2001]. Retrieved from the Internet <URL:http//download.cnet.com/downloads/0-10059-100-7003126.html>.
Adextinguisher—Introduction and News Sections. Webpage [online][retrieved on Oct. 4, 2001]. Retrieved from the Internet URL:http//adext.magenet.net.html.
AdPurger, Webpage [online]. C/net Downloads.com [retrieved on Oct. 4, 2001]. Retrieved from the Internet <URL:http//download.cnet.com/downloads/0-10068-100-5067717.html>.
AdsOff, Webpage [online]. C/net Downloads.com [retrieved on Oct. 3, 2001]. Retrieved from the Internet <URL:http//download.cnet.com/downloads/0-10059-100-9 12651.html>.
AdSubract SE, Webpage [online]. C/net Downloads.com [retrieved on Oct. 4, 2001]. Retrieved from the Internet <URL:http//download.cnet.com/downloads/0-3356727-100-5963713.html>.
Advertising Killer, Webpage [online]. C/net Downloads.com [retrieved on Oct. 3, 2001]. Retrieved from the Internet <URL.http//download.cnet.com/downloads/0-10059-100-1539520.html>.
Advisory Action dated Nov. 19, 2008 issued in U.S. Appl. No. 11/015,583, 3 pages.

Aggarwal, Charu C. et al. 2001. Intelligent Crawling on the World Wide Web with Arbitrary Predicates. ACM, pp. 96-105.
AllGone, Webpage [online]. C/net Downloads.com [retrieved on Oct. 4, 2001]. Retrieved from the Internet <URL:http//download.cnet.com/downloads/0-10068-100-2915974.html>.
AnalogX Pow, Webpage [online]. C/net Downloads.com [retrieved on Oct. 3, 2001]. Retrieved from the Internet <URL:http//download.cnet com/downloads-0-3356748-100-915372.html>.
Bae, Sung Min, et al., "Fuzzy Web Ad Selector", IEEE Intelligent Systems, vol. 18 Issue 6, Nov./Dec. 2003, pp. 62-69.
Banner Zapper, Webpage [online]. C/net Downloads.com [retrieved on Oct. 4, 2001]. Retrieved from the Internet <URL:http//download.cnet.com/downloads/0-3356727-100-6384611.html>.
BanPopup, Webpage [online]. C/net Downloads.com [retrieved on Oct. 4, 2001]. Retrieved from the Internet <URL:http//download.cnet.com/downloads/0-10059-100-6901908.html>.
Black List. Webpage [online]. C/net Downloads.com [retrieved on Oct. 4, 2001]. Retrieved from the Internet <URL.http/download cnet.com/downloads/0-10059-100-902347 html>.
Broder, Alan J., "Data Mining the Internet and Privacy", WEBKDD '99, LNAI 1836, Springer-Verlag, Berlin, Germany, (c) 2000, pp. 56-73.
Bucklin, Randolph E., et al., "Choice and the Internet: From Clickstream to Research Stream", Marketing Letters, vol. 13, No. 3, Aug. 2002, pp. 245-258.
Claria—Company Information—Corporate Review, webpage [online], retrieved on Mar. 3, 2005, retrieved from the internet: <URL:http://www.claria.com/companyinfo.html>.
Claypool, et al., Inferring User Interest, Worcester Polytechnic Inst., IEEE Internet Computing, Nov.-Dec. 2001, pp. 32-39 [8 pgs.].
Close Popup 4.0, Webpage [online]. Take a Hike Software [retrieved on Oct. 4, 2001]. Retrieved from the Internet <URL:http//www.ryanware.com/close_popup.html>.
Close Popup, Webpage [online]. C/net Downloads.com [retrieved on Oct. 4, 2001]. Retrieved from the Internet <URL:http//download.cnet.com/downloads/0-10059-100-905799.html>.
CobraSoft PopStop, Webpage (online). C/net Downloads.com [retrieved on Oct. 4, 2001]. Retrieved from the Internet <URL:http//download cnet.com/downloads/0-10058-100-6926765.html>.
CODELIFTER.COM: JavaScript Index Windows and Frames. [online] [retrieved on Dec. 19, 2005]. Retrieved from the internet:<URL://http://www.codelifter.com/main/javascript/index_windowframes.html> [Cited by EPO as "X"reference for EP 02 77 8589 in Supplementary European Se.
Compare Prices and Read Reviews on AdsOff! Epenions.com. Webpage [online]; Jan. 21, 2001. Obtained from corresponding International Application PCT Search Report.
ComScore Marketing Solutions and Media Metrix (9 sheets), webpage) [online], 2003 comScore Networks, Inc. (retrieved on Oct. 8, 2003), retrieved from the internet: <URL:http://vAvw.comscore.com>.
Copernic, Copernic: Software to Search, Find, and Manage Information, Copernic Technologies, Inc. 2004, 2 pgs. (retrieved on Apr. 6, 2004). Retrieved from the Internet<URL:http://www.copernic.com/en/index.html>.
CrushPop 2000, Webpage [online]. www.32bit.com [retrieved on Oct. 4, 2001]. Retrieved from the Internet <URL.http//32bit.com/software/listings/Internet/Special/180P/13794.html>.
Definition of "close button", Microsoft Press Computer Dictionary, 3rd ed. (Redmond WA: Microsoft Press, 1997).
Diligenti, Michelangelo et al. 2004. A Unified Probalistic Framework for Web Page Scoring Systems. IEEE, vol. 16, No. 1. Jan. 2004, pp. 4-16.
Directive 2002/58/EC of the European Parliament and of the Council of Jul. 12, 2002 concerning the processing of personal data and the protection of privacy in the electronic communications sector (Directive on privacy and electronic communications), Official Journal L 201, Jul. 31, 2002 p. 0037-0047 (downloaded.
Dogpile, Dogpile Web Search Home Page, InfoSpace, Inc. 2004, p. 1 of 1, (retrieved on Apr. 1, 2004). Retrieved from the Internet: <URL:http://www.dogpile.com.html>.

DoubleClick products (17 total pgs); Webpage [online] [retrieved on Jun. 11, 2003]; Retrieved from the Internet: <URL: http://www.doubleclick.com>.

Eick, Stephen G., "Visual Analysis of Website Browsing Patterns", Visual Interfaces to Digital Libraries, Springer-Verlag, Berlin, Germany, (c) 2002, pp. 65-77.

Eirinaki, Magdalini, et al., "Web Mining for Web Personalization", ACM Transactions on Internet Technology (TOIT), vol. 3, Issue 1, Feb. 2003, pp. 1-27.

EPO Communication in European Appln. No. 02778589, completed Dec. 21, 2005 (2 Sheets).

EPO Communication in European Appln. No. 04795209, mailed Feb. 17, 2011 [160 pages].

EPO Communication in European Appln. No. 04795209, mailed Feb. 17, 2011 [4 pages].

EPO File History of EP 2004795209, downloaded from European Patent Office on Apr. 13, 2011 [164 pgs.].

EPO, Communication for EP 03 75 5344, Feb. 14, 2011 [4 pgs.].

EPO, File history of EP-03755344.3, Method and Apparatus for Displaying Messages in Computer Systems, as of Feb. 21, 2011 [121 pgs.].

EPO, File history of EP 2004794999, downloaded from EPO Apr. 13, 2011 [204 pgs.].

EPO, File history of EP1714221 (downloaded from EPO on Apr. 13, 2011) [139 pages].

EPO, Supplementary European Search Report for EP 03 75 5344, Jun. 30, 2009, mailed Jul. 10, 2009 [2 pgs.].

European Search Report for Application No. EP 06 01 3103 (2 sheets).

Favela, Jesus et al. 1997. Image-Retrieval Agent: Integrating Image Content and Text. IEE, vol. 1.14, pp. 36-39.

Fenstermacher, Kurt D., et al., "Client-Side Monitoring for Web Mining", Journal of the American Society for Information Science and Technology, vol. 54, Issue 7, May 2003, pp. 625-637.

Fenstermacher, Kurt D., et al., "Mining Client-Side Activity for Personalization", WECWIS 2002, (c) 2002, pp. 205-212.

Final Office Action dated Mar. 26, 2010 issued in U.S. Appl. No. 11/207,590, 8 pages.

Final Rejection dated May 21, 2008 issued in U.S. Appl. No. 11/015,583, 8 pages.

Friedman, Batya, et al., "Informed Consent in the Mozilla Browser: Implementing Value-Sensitive Design", HICSS-35 '02, Jan. 2002, pp. 10-19.

Fu, Xiaobin, et al., "Mining Navigation History for Recommendation", IUI 2000, New Orleans, LA, (c) 2000, pp. 106-112.

Google search for "define: close button", Mar. 2, 2007.

Google Search, "Result Search Query Build Search Engine Index Using Gather Consumer Navigate Search", http://scholar.google.com/scholar, dated Apr. 7, 2010, 3 pages.

Gralla, Preston, How the Internet Works, Special Edition, Ziff-Davis Press, Emeryville, CA, .(c) 1997, pp. 254 and 266-271.

Greening, Dan R., "Tracking Users: What Marketers Really Want to Know", Web Techniques, Jul. 1999, downloaded from: www.webtechniques.com/archives/1999/07/, pp. 1-9.

Heinle et al. 1997. Designing with JavaScript: Creating Dynamic Web Pages.Sep. 1997, pp. 1-33, 46, 83 [Cited by EPO as "A" reference for EP 02 77 8589 in Supplementary European Search Report dated Dec. 21, 2005].

Heller, Laura, "Target gets mod in Manhattan", DSNRetailing Today, v40 n16, Aug. 20, 2001: 2, 37.

Hongyu Liu et al., "Focused Crawling by Learning HMM from User's Topic-Specific Browsing" Proceedings of the IEEE/WIC/ACM International Conference on Web Intelligence (WI '04) 0-7695-2100-2/04.

Hun, Ke et al. 2003. A Probabilistic Model for Intelligent Web Crawlers. IEEE, pp. 278-282.

InterMute, Webpage [online]. C/net Downloads.com [retrieved on Oct. 3, 2001]. Retrieved from the Internet <URL:http//download.cnet.com/downloads/0-10059-100-906599.html>.

International Preliminary Report on Patentability and Written Opinion in PCT Appln. No. PCT/US2004/033777, mailed Jan. 19, 2006.

International Preliminary Report on Patentability and Written Opinion in PCT Appln. No. PCT/US2005/001022, dated Apr. 26, 2006.

International Preliminary Report on Patentability and Written Opinion in PCT Appln. No. PCT/US2005/029615, mailed Mar. 9, 2006.

International Preliminary Report on Patentability and Written Opinion in PCT Appln. No. PCT/US2005/035352, mailed Sep. 11, 2007.

International Preliminary Report on Patentability and Written Opinion in PCT Appln. No. PCT/US2006/009954, mailed Aug. 30, 2006.

International Preliminary Report on Patentability and Written Opinion in PCT Appln. No. PCT/US2006/025102, mailed Jul. 26, 2007.

International Preliminary Report on Patentability and Written Opinion in PCT Appln. No. PCT/US2006/25104, mailed Jan. 23, 2007.

International Preliminary Report on Patentability and Written Opinion in PCT Appln. No. PCT/US2007/061944, mailed Feb. 14, 2008.

International Preliminary Report on Patentability in PCT Appln. No. PCT/US2006/008049, dated Nov. 6, 2007.

International Preliminary Report on Patentability in PCT Appln. No. PCT/US2006/008050, dated Nov. 6, 2007.

International Preliminary Report on Patentability in PCT Appln. No. PCT/US2006/025103, dated Mar. 24, 2009.

International Search Report and Written Opinion in PCT Appln. No. PCT/US2006/008049, mailed Oct. 19, 2007.

International Search Report and Written Opinion in PCT Appln. No. PCT/US2006/008050, mailed on Oct. 19, 2007.

International Search Report and Written Opinion of the International Search Authority for Intl. Appl. No. PCT/US05/45722 mailed Jan. 19, 2007.

International Search Report and Wrtitten Opinion in PCT Appln. No. PCT/US2006/025103, mailed Jan. 29, 2008.

International Search Report in EP Appln. No. 05802579.2-1527, dated May 2, 2008.

International Search Report in PCT Appln. No. PCT/US2004/033777, mailed Jan. 19, 2006.

International Search Report in PCT Appln. No. PCT/US2005/001022, mailed Apr. 24, 2006.

International Search Report in PCT Appln. No. PCT/US2005/029615, mailed Mar. 9, 2006.

International Search Report in PCT Appln. No. PCT/US2006/009954, mailed Aug. 30, 2006.

International Search Report in PCT Appln. No. PCT/US2006/025102, mailed Jul. 26, 2007.

International Search Report in PCT Appln. No. PCT/US2006/25104, mailed Jan. 23, 2007.

International Search Report in PCT Appln. No. PCT/US2007/061944, mailed Feb. 14, 2008.

Internet Citation: "Gator.com offers one-click shopping at over 5,000 e-commerce site today"; Jun. 14, 1999; XP002145278; Date retrieved: Jun. 28, 2001. URL:http://www.gator.com/company/press/pr061499b.html.

IRTORG—Internet Related Technologies: "irt.org—JavaScript Windows FAQ Knowledge Base" Internet Article, Online! Jun. 3, 2000, XP002360403, Retrieved from the Internet : URL:http://web.archive.org/web/20000619232700/developer.irt.org/script/window.htm> (retrieved on Dec. 19, 2005) [Cited by EPO as "X"reference for EP 02 77 8589 in Supplementary European Search Report dated Dec. 21, 2005].

Ishitani, Lucila, et al., "Masks: Bringing Anonymity and Personalization Together", IEEE Security & Privacy, vol. 1, Issue 3, May/Jun. 2003, pp. 18-23.

Japanese Patent Office, Office Action mailed Jul. 26, 2010 from Japanese Serial No. JP2008-519504 filed Jun. 28, 2006.

Keys. 1998. Every Possible Internet Advertisement Drastic Increase of Click Through Rate by Interactivity and Multimedia. Nikkei Internet Technology. Dec. 22, 1998. January Issue (1999), vol. 18, pp. 118-127.

KIPO, Official Action in Korean Patent Appln. No. 10-2006-7008977.

Kiyomitsu, Hidenari, et al., "Web Reconfiguration by Spatio-Temporal Page Personalization Rules Based on Access Histories", Applications and the Internet, San Diego, CA, Jan. 8-12, 2001, pp. 75-82.

Klemm, Reinhard P., "WebCompanion: A Friendly Client-Side Web Prefetching Agent", IEEE Transactions on Knowledge and Data Engineering, vol. 11, No. 4, Jul./Aug. 1999, pp. 577-594.

Kourbatov, Opening a Window, Jul. 8, 2000, plubished by www.javascripter.net, whole document.

Langheinrich, M., et al. "Unintrusive Customization Techniques for Web Advertising," NEC Corporation, C&C Media Research Laboratories, Kanagawa, Japan, Computer Networks, vol. 31, No. 11, pp. 1259~1272, May 1999 (in Conf. Proc. 8th Int'l WWW Conf., Toronto, Canada, May 11-14, 1999).

Lee, Ching-Cheng, et al., "Category-Based Web Personalization System", COMPSAC 2001, Oct. 8-12, 2001, pp. 621-625.

Leuski, Anton et al. 2000. Lighthouse: Showing the Way to Relevant Information. IEEE, Oct. 2000, pp. 125-129.

Liu, Jian-Guo, et al., "Web Mining for Electronic Business Application", PDCAT 2003, Aug. 27-29, 2003, pp. 872-876.

Liu, Jian-Guo, et al., "Web Usage Mining for Electronic Business Applications", Machine Learning and Cybernetics, Shanghai, China, Aug. 2004, pp. 1314-1318.

Lu, Hongjun, et al., "Extending a Web Browser with Client-Side Mining", APWeb 2003, LNCS 2642, Springer-Verlag, Berlin, Germany, (c) 2003, pp. 166-177.

Luxenburger, Julia, et al., "Query-Log Based Authority Analysis for Web Information Search", WISE 2004, LNCS 3306, Springer-Verlag, Berlin, Germany, Nov. 1, 2004, pp. 90-101.

Marcebra Net, Webpage [online]. C/net Downloads.com [retrieved on Oct. 4, 2001]. Retrieved from the Internet <URL:http//download.cnet.com/downloads/0-3364666-100-5210875.html>.

Metacrawler, Web Search Home Page—MetaCrawler, InfoSpace, Inc. 2004, p. 1 of 1 (retrieved on Apr. 6, 2004), Retrieved from the internet: <URL:http://www.metacrawler.com.html>.

Mitchell, T., "Decision Tree Learning Based on Machine Learning" (Apr. 5, 2003), lecture slides for textbook Machine Learning, McGraw Hill, 1997, pp. 46-74 [29 pgs.].

Mobasher, Bamshad, et al., "Automatic Personalization Based on Web Usage Mining", Communications of the ACM, vol. 43, Issue 8, Aug. 2000, pp. 142-151.

Montgomery, Alan et al., Learning About Customers Without Asking, Carnegie Mellon University, Tepper School of Business, Jan. 2002 [35 pgs.].

Mr. KillAd. Webpage [online]. C/net Downloads.com [retrieved on Oct. 4, 2001]. Retrieved from the Internet <URL:http//download.cnet.com/downloads/0-10059-100-895339 html>.

Nagger, Webpage [online]. C/net Downloads.com [retrieved on Oct. 4, 2001]. Retrieved from the Internet <URL:http//download.cnet.com/downloads/0-3356748-100-2497932 html>.

NielsenllNetRatings (24 sheets), webpage [online], 2003 NetRatings, Inc. (retrieved on Oct. 8, 2003), retrieved from the internet: <URL:http://www.nielsen-netratings.com>.

NoAds 2000.6.30.1, Webpage [online] south bay software [retrieved on Oct. 4, 2001]. Retrieved from the Internet <URL:http//www.southbaypc.com/NoAds.html>.

Non-Final Rejection dated Dec. 20, 2006 issued in U.S. Appl. No. 11/015,583, 8 pages.

Non-Final Rejection dated Jul. 20, 2009 issued in U.S. Appl. No. 11/015,583, 7 pages.

NoPops 1.1, Webpage [online]. WebAttack.com [retrieved on Oct. 4, 2001]. Retrieved from the Internet <URL:http//www.webattack.com/get/nopops.shtml>.

Office Action mailed Feb. 2, 2010 from European Serial No. 06013103.4 filed Jun. 16, 2006.

Office Action mailed Nov. 2, 2005 from U.S. Appl. No. 10/061,107, filed Jan. 25, 2002.

Office Action mailed Aug. 3, 2009 from U.S. Appl. No. 11/427,226, filed Jun. 28, 2006.

Office Action mailed Feb. 4, 2010 from U.S. Appl. No. 11/427,243, filed Jun. 28, 2006.

Office Action mailed Jun. 7, 2010 from U.S. Appl. No. 11/427,226, filed Jun. 28, 2006.

Office Action mailed Dec. 8, 2008 from U.S. Appl. No. 11/427,243, filed Jun. 28, 2006.

Office Action mailed Aug. 10, 2009 from U.S. Appl. No. 11/427,282, filed Jun. 28, 2006.

Office Action mailed Oct. 10, 2007 from U.S. Appl. No. 11/207,590, filed Aug. 19, 2005.

Office Action mailed May 12, 2008 from U.S. Appl. No. 11/427,243, filed Jun. 28, 2006.

Office Action mailed Oct. 12, 2010 from U.S. Appl. No. 11/427,243, filed Jun. 28, 2006.

Office Action mailed Aug. 13, 2003 from U.S. Appl. No. 10/061,107, filed Jan. 25, 2002.

Office Action mailed Sep. 13, 2006 from U.S. Appl. No. 10/700,820, filed Nov. 4, 2003.

Office Action mailed Jan. 14, 2004 in U.S. Appl. No. 10/061,107, filed Jan. 25, 2002.

Office Action mailed Oct. 16, 2008 from U.S. Appl. No. 11/207,590, filed Aug. 19, 2005.

Office Action mailed Sep. 16, 2004 from U.S. Appl. No. 10/056,932, filed Jan. 25, 2002.

Office Action mailed Mar. 18, 2005 from U.S. Appl. No. 10/056,932, filed Jan. 25, 2002.

Office Action mailed Jun. 22, 2009 from U.S. Appl. No. 11/207,590, filed Aug. 19, 2005.

Office Action mailed Jun. 24, 2008 from U.S. Appl. No. 11/207,592, filed Aug. 19, 2005.

Office Action mailed May 24, 2007 from U.S. Appl. No. 10/700,820, filed Nov. 4, 2003.

Office Action mailed Apr. 25, 2006 from U.S. Appl. No. 10/700,820, filed Nov. 4, 2003.

Office Action mailed Feb. 25, 2009 from U.S. Appl. No. 11/207,592, filed Aug. 19, 2005.

Office Action mailed Jun. 25, 2009 from U.S. Appl. No. 11/427,243, filed Jun. 28, 2006.

Office Action mailed Dec. 26, 2006 from U.S. Appl. No. 10/700,820, filed Nov. 4, 2003.

Office Action mailed Mar. 26, 2010 from U.S. Appl. No. 11/207,590, filed Aug. 19, 2005.

Office Action mailed Apr. 27, 2010 from U.S. Appl. No. 11/427,282, filed Jun. 28, 2006.

Office Action mailed Jul. 27, 2005 from U.S. Appl. No. 10/056,932, filed Jan. 25, 2002.

Office Action mailed Oct. 27, 2010 from U.S. Appl. No. 11/207,590, filed Aug. 19, 2005.

Office Action mailed Sep. 27, 2007 from U.S. Appl. No. 11/207,592, filed Aug. 19, 2005.

Office Action mailed Sep. 28, 2010 from U.S. Appl. No. 10/061,107, filed Jan. 25, 2002.

Office Action mailed Sep. 5, 2003 from U.S. Appl. No. 10/056,932, filed Jan. 25, 2002.

Office Action mailed May 7, 2004 from U.S. Appl. No. 10/056,932, filed Jan. 25, 2002.

Office Action mailed Oct. 19, 2007 from U.S. Appl. No. 11/207,589, filed Aug. 19, 2005.

Offie Action mailed May 5, 2006 from U.S. Appl. No. 10/061,107, filed Jan. 25, 2002.

Paepcke, Andreas, et al., "Beyond Document Similarity: Understanding Value-Based Search and Browsing Technologies", ACM SIGMOD Record, vol. 29, Issue 1, Mar. 2000, pp. 80-92.

Paganelli, Laila, et al., "Intelligent Analysis of User Interactions with Web Applications", IUI '02, San Francisco, CA, Jan. 13-16, 2002, pp. 111-118.

Paraben's AdStopper, Webpage [online]. C/net Downloads.com [retrieved on Oct. 4, 2001]. Retrieved from the Internet <URL:http//download.cnet.com/downloads/0-10059-100-2643648.html>.

Park, Joon S., et al., "Secure Cookies on the Web", IEEE Internet Computing, vol. 4, Issue 4, Jul./Aug. 2000, pp. 36-44.

Payton, D., et al. 1999. Dynamic collaborator discovery in information intensive environments. ACM Comput. Surv. 31, 2es, Article 8 (Jun. 1999), pp. 1-8.

PCT International Search Report and Written Opinion dated Jul. 12, 2007, for International Application No. PCT/US06/023386.

PCT International Search Report dated Jan. 23, 2007, for International Application No. PCT/US06/025104.

PCT International Search Report for application No. PCT/US02/35981, 3 sheets; mailed Apr. 4, 2003.

PCT International Search Report for Application No. PCT/US04/09918.

PCT International Search Report for PCT/US03/13985 mailed Aug. 8, 2003; total of 1 sheet.

PCT International Search Report re: International Application No. PCT/US05/29615 dated Feb. 20, 2006.

Pierrakos, Dimitrios, et al., "Web Usage Mining as a Tool for Personalization: A Survey", User Modeling and User-Adapted Interaction, vol. 13, No. 4, (c) 2003, pp. 311-372.

Pierre Maret, et al.; Multimedia Information Interchange: Web Forms Meet Data Servers; Proceedings of the IEEE International Conference on Multimedia Computing and Systems; vol. 2, Jun. 7-11, 1999, pp. 499-505; XP000964627; Florence, Italy.

Popki Popup Closer 1.4, Webpage [online]. WebAttack.com [retrieved on Oct. 4, 2001]. Retrieved from the Internet <URL:http//www.webattack.com/get/popki.shtml>.

PopKill, Webpage [online]. C/net Downloads.com [retrieved on Oct. 4, 2001]. Retrieved from the Internet <URL:http//download.cnet.com/downloads/0-10059-100-6967054.html>.

PopNot, Webpage [online]. C/net Downloads.com [retrieved on Oct. 4, 2001]. Retrieved from the Internet <URL http//download.cnet.com/downloads/0-10059-100-5112702.html>.

PopUp Eraser, Webpage [online]. C/net Downloads.com [retrieved on Oct. 4, 2001]. Retrieved from the Internet <URL:http//download.cnet.com/downloads/0-10059-100-6322841.html>.

Popup Hunter, Webpage [online]. C/net Downloads.com [retrieved on Oct. 4, 2001]. Retrieved from the Internet <URL:http//download.cnet.com/downloads/0-10059-100-1451171.html>.

PopUp Killer, Webpage [online]. C/net Downloads.com [retrieved on Oct. 3, 2001]. Retrieved from the Internet <URL.http//download.cnet.com/downloads/0-10059-100-7253644 html>.

Popup Smasher, Webpage [online]. C/net Downloads.com [retrieved on Oct. 4, 2001]. Retrieved from the Internet <URL:http/download.cnet.com/downloads/0-3364664-100-7209048.html>.

Pop-up stopper, Webpage [online]. C/net Downloads.com [retrieved on Oct. 3, 2001]. Retrieved from the Internet <URL:http//download.cnet.com/downloads/0-10059-100-6803957.sub.--html&- gt;.

PopupDummy, Webpage [online]. C/net Downloads.com [retrieved on Oct. 4, 2001]. Retrieved from the Internet <URL:http//download.cnet.com/downloads/0-10059-100-6943327.html>.

Privacy and Electronic Communications (EC Directive) Regulations 2003 (PECR), No. 2426, Electronic Communication, Sep. 2003.

Ready, Kevin et al., "Plug-n-Play Java Script" (Indianapolis, IN: New Riders Publishing, 1996): 19-22, 39, 40 and 43-45.

Restriction Requirement dated Oct. 31, 2007 issued in U.S. Appl. No. 11/015,583, 6 pages.

Schonberg, Edith, et al., "Measuring Success", Communications of the ACM, vol. 43, Issue 8, Aug. 2000, pp. 53-57.

Shahabi, Cyrus, et al., "Efficient and Anonymous Web-Usage Mining for Web Personalization", INFORMS Journal on Computing, vol. 15, No. 2, Spring 2003, pp. 123-148.

Smith, Lindsay I. 2002. A Tutorial on Principal Components Analysis. Feb. 26, 2002.

Soumen Chakrabarti et al., "Focused Crawling: A New Approach to Top-Specific Web Resource Discovery" Computer Networks 31 (1999), pp. 1623-1640.

Srivastava, Jaideep, et al., "Web Usage Mining: Discovery and Applications of Usage Patterns from Web Data", SIGKDD Explorations, vol. 1. Issue 2, Jan. 2000, pp. 12-23.

Supplemental Notice of Allowability from U.S. Appl. No. 11/207,589, filed Aug. 19, 2005.

Surf in Peace 2.01, Webpage [online]. WebAttack.com [retrieved on Oct. 4, 2001]. Retrieved from the Internet <URL:http//www.webattack.com/get/sip.shtml>.

Takahashi. 2001. JavaScript Lab: Safe Control of Pop-up Windows. Web Designing. Mainichi Communications, Inc. Jun. 10, 2001. No. 9, vol. 12, pp. 86-89 (separate volume of Mac Fan of Jun. 10 issue).

U.K. Intellectual Property Office, Examination Report in Great Britain application, GB0724938.6, dated Jan. 11, 2010, 2 pages.

U.K. Intellectual Property Office, Official Action for British Application No. GB0724938.6, filed Jun. 28, 2008, Feb. 16, 2011—UK IPO Decision of Rejection.

U.K. Intellectual Property Office, Official Action mailed Jul. 16, 2010 for British Application No. GB0724938.6, filed Jun. 28, 2008 [1 pg.].

U.S. Appl. No. 09/993,887, filed Nov. 27, 2001, by Jax B. Cowden, et al.

U.S. Appl. No. 09/993,904, filed Nov. 27, 2001, by Jax B. Cowden, et al.

U.S. Appl. No. 09/993,906, filed Nov. 27, 2001, by Jax B. Cowden, et al.

U.S. Appl. No. 10/061,107—Apr. 18, 2011 PTO Office Action.

U.S. Appl. No. 11/420,191—Mar. 25, 2011 PTO Office Action.

U.S. Appl. No. 11/427,243—May 10, 2011 PTO Office Action.

Uehara, Satoru, et al., "An Implementation of Electronic Shopping Cart on the Web System Using component-Object Technology", Proc. of the 6th International Conf./ on Object-Oriented Real-Time Dependable Systems, Jan. 8-10, 2001, pp. 77-84.

Ultraseek Server Detailed Feature List, http://software.infoseek.com/products/ultraseek/ultrafeatures.htm, Accessed from Apr. 1998 archive from http://web.archive.org/web/19980419092128/http://software.infoseek.com/products/.

US. Appl. No. 09/993,888, filed Nov. 27, 2001, by Mark E. Pennell, et al.

USPTO, Office Action in U.S. Appl. No. 11/688,160, mailed Feb. 16, 2011.

USPTO, Office Action mailed Nov. 28, 2006 for U.S. Appl. No. 10/227,168, filed Aug. 23, 2002.

USPTO, Office Action mailed Jul. 3, 2006 from U.S. Appl. No. 10/227,168, filed Aug. 23, 2002.

Web Magician, Webpage [online]. RocketDownLoad.com [retrieved on Oct. 4, 2001]. Retrieved from the Internet <URL:http/www.rocketdownload.com/Details/Inte/webmag.html>.

Wenyin, Liu, et al., "Ubiquitous Media Agents: A Framework for Managing Personally Accumulated Multimedia Files", Multimedia Systems, vol. 9, No. 2, Aug. 2003, pp. 144-156.

WIPO, International Preliminary Report on Patentability (Chap. I of PCT) for PCT/US04/33777, Jan. 23, 2006 [4 pgs].

WIPO, International Preliminary Report on Patentability (Chap. I of PCT) for PCT/US05/01022, Aug. 14, 2006 [6 pgs].

WIPO, International Search Report for PCT/US04/33777, Jan. 19, 2006 [3 pgs.].

WIPO, International Search Report for PCT/US05/01022, Apr. 24, 2006 [3 pgs.].

WIPO, Written Opinion of the International Searching Authority for PCT/US04/33777, Jan. 23, 2006 [3 pgs].

WIPO, Written Opinion of the International Searching Authority for PCT/US05/01022, Apr. 26, 2006 [5 pgs].

www.conversionruler.com/faq.php, Feb. 4, 2003.

Xu, Cheng-Zhong, et al., "A Keyword-Based Semantic Prefetching Approach in Internet News Services", IEEE Transactions on Knowledge and Data Engineering, vol. 16, Issue 5, May 2004, pp. 601-611.

Yuichi Yagawa et al. TV Program Planning Agent using Analysis Method of User's Taste; IEICE Technical Report vol. 98, No. 437: The Institute of Electronics, Information and Communication Engineers; Dec. 1, 1998, vol. 98, No. 437, pp. 9-16.

Zaiane, Osmar R., et al., "Discovering Web Access Patterns and Trends by Applying OLAP and Data Mining Technology on Web Logs", IEEE International Forum on Research and Technology Advances in Digital Libraries, Santa Barbara, CA, Apr. 22-24, 1998, pp. 19-29.

Zero Popup, Webpage [online]. C/net Downloads.com [retrieved on Oct. 4, 2001]. Retrieved from the Internet <URL:http//download.cnet.com/downloads/0-3356748-100-7163307.html>.

BackWeb Technologies Ltd., BackWEB User's Guide, 1997, [48 pgs.].

Hancock, Wayland, "A new way to get information from the Internet," American Agent & Broker, Nov. 1997, 69, 11, pp. 65-66 [2 pgs.].

International Search Report in PCT Appln. No. PCT/US2005/035352, mailed Sep. 11, 2007.

Japanese Patent Office, Official Action issued Dec. 17, 2010, mailed Dec. 27, 2010 in Japanese Patent Application No. 2007-528053 (non-official translation), 7 pgs.

Kurohashi, Sadao, et al. 1997. The Method for Detecting Important Descriptions of a Word Based on its Density Distribution in Text. Information Processing Society of Japan. vol. 38, Issue No. 4 (Apr. 15, 1997), pp. 845-854.

Netscape Communications Corp., Netcaster Developer's Guide, Netscape Communicator, Sep. 25, 1997 [112 pgs.].

Nilsson, B. A., and Robb, J., "Invasion of the Webcasters," PC World, vol. 15, No. 9 (Sep. 1997) p. 204-216 [9 pgs.].

Otsuka, Shingo, et al. 2004. The Analysis of Users Behavior Using Global Web Access Logs. IPSJ SIG Technical Report, vol. 2004 No. 71 (Jul. 13, 2004), pp. 17-24.

PCT International Preliminary Report on Patentability, dated Jan. 9, 2008, for International Application No. PCT/US06/023386.

PCT International Search Report and Written Opinion dated Jul. 26, 2007, for International Application No. PCT/US06/025102.

PCT International Search Report and Written Opinion dated Jun. 28, 2006, for International Application No. PCT/US06/025103.

PCT International Search Report and Written Opinion mailed Feb. 14, 2008, for International Application No. PCT/US07/061944.

Office Action mailed Oct. 16, 2007 from U.S. Appl. No. 11/210,209, filed Aug. 22, 2005.

SideStep, The Traveler's Search Engine; Webpage [online] [retrieved on Oct. 7, 2004] retrieved from the internet: <URL:http://www.sidestep.com/main.html.

Visual Search ToolBar—Graphically Enhance Search Results, 2004 Viewpoint Corporation; Webpage [online] ] retrieved on Oct. 7, 2004]; retrieved from the internet: <URL:http://www.viewpoint.com/pub/toolbar/download.html.

Office Action mailed Jan. 12, 2005 from U.S. Appl. No. 10/289,123, filed Nov. 5, 2002.

Shopping with WhenUShop, Webpage [online]; WhenU.com [retrieved on Mar. 20, 2002}. Retrieved from the internet: URL:http://www.whenu.com.

Office Action mailed Jul. 1, 2005 from U.S. Appl. No. 10/289,123, filed Nov. 5, 2002.

Office Action mailed Jan. 5, 2006 from U.S. Appl. No. 10/289,123, filed Nov. 5, 2002.

Office Action mailed Jun. 13, 2006 from U.S. Appl. No. 10/289,123, filed Nov. 5, 2002.

Notice of Allowance mailed Sep. 24, 2008 from U.S. Appl. No. 10/289,123, filed Nov. 5, 2002.

Office Action mailed Jan. 5, 2005 from U.S. Appl. No. 10/462,574, filed Jun. 16, 2003.

Search Report mailed Mar. 31, 2005 from International Serial No. PCT/US2004/007714 filed Feb. 27, 2004.

Office Action mailed Jul. 1, 2005 from U.S. Appl. No. 10/462,574, filed Jun. 16, 2003.

Office Action mailed Jan. 5, 2006 from U.S. Appl. No. 10/462,574, filed Jun. 16, 2003.

Office Action mailed Jun. 13, 2006 from U.S. Appl. No. 10/462,574, filed Jun. 16, 2003.

Notice of Allowance mailed May 29, 2009 from U.S. Appl. No. 10/462,574, filed Jun. 16, 2003.

* cited by examiner

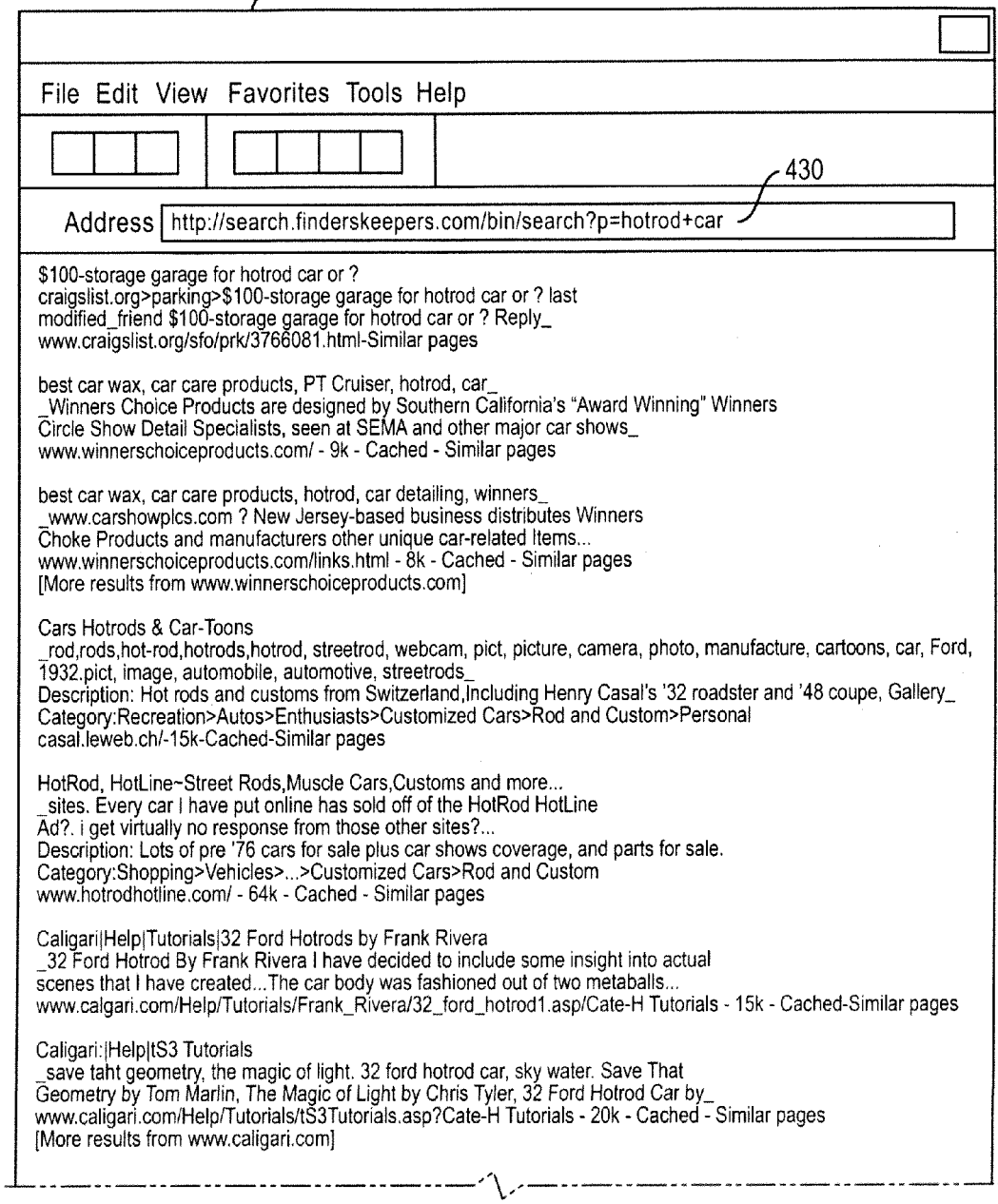
FIG. 4B (Part 1)

Hotrod car books-books on hotrods from motolit.com, literature...
_Motolit Home Page>Car books>Car Books by Type>Hotrod Car Books,Hotrod
Car Books, How to Build the Ultimate American Hotrod(19.95), Hot Rod (22.95)._
shop.store.yahoo.com/motolit/hotrods.html - 52k - Cached - Similar pages Dons Auto Pages-NZ:Car,Hotrod and Motorsport clubs
A1 Listing of N7:Car Clubs by Makes - To go to General,Hotrod and Motorsport
clubs Click here. If you know any of the following contact...
homepages.ihug.com/~don_S/nccarclubs.htm - 90k - Cached-Similar pages SMITTY'S HOTROD PAGE
_IF YOU DON'T SEE PHOTOS OR ARE STUCK IN FRAMES CLICK HERE HOT ROD & CUSTOM
CAR MAGAZINES SUMMER RIDE-1937 FORD_ADD YOUR "CAR-SITE" LINKS HERE...
Description: Maine built hot rods, street rods, and custom cars. Thousands of car photos, hot rod slide shows, and...
Category: Recreation>Autos>Enthusiasts>Customized Cars>Rod and Custom>Personal
members.aol.com/hot 1932rod/ - 12k - Cached - Similar pages

FIG. 4B (Part 2)

UPDATING CONTENT OF PRESENTATION VEHICLE IN A COMPUTER NETWORK

REFERENCE TO RELATED APPLICATION

This application seeks priority to and is a continuation of U.S. application Ser. No. 10/462,574, filed on Jun. 16, 2003, entitled "Updating the Content of a Presentation Vehicle in a Computer Network," filed by Anthony G. Martin, Scott Vandevelde, and David L. Goulden, published Jun.24, 2004 as U.S. Publication No. 2004-0122808, and issued on Oct.14, 2009 as U.S. Pat. No. 7,603,341, which is a continuation-in-part of U.S.application Ser. No. 10/289,123, filed on Nov. 05, 2002 issued as U.S Pat. No. 7,512,603, entitled "Responding to End-User Request for Information in a Computer Network," issued on May 31, 2009, by Eugene A. Veteska, David L. Goulden, and Anthony G. Martin, which are both incorporated herein by reference in entirety. U.S. application Ser. No. 10/462,574, filed on Jun. 16, 2003, entitled "Updating the Content of a Presentation Vehicle in a Computer Network," (U.S. Pat. No. 7,603,341) also claimed benefit of U.S. Provisional Application No. 60/457,524, entitled "Updating the Content of a Presentation Vehicle in a Computer Network," filed by Scott Vandevelde, David L. Goulden, and Anthony G. Martin on Mar. 25, 2003, which is incorporated herein by reference in its entirety.

BACKGROUND OF THE INVENTION

1. Field of the Invention

The present invention relates generally to computer systems, and more particularly but not exclusively to presentation of information in a computer network.

2. Description of the Background Art

The Internet is an example of a computer network. On the Internet, end-users on client computers may access various types of information resident in server computers. A server computer that provides information over the Internet is also referred to as a "web server" or a "web site". A web site may provide information about various topics or offer goods and services. Some web sites include a search engine that allows an end-user to search on the Internet. Examples of such web sites include Yahoo, Google, and Alta Vista. A web site may also include a search engine for searching the web site. For example, an on-line bookstore may include a search engine for allowing a prospective buyer to look for specific novels available from the bookstore.

Just like in other media such as radio and television, companies may advertise on the Internet. Advertising revenues may help pay for the development and maintenance of free software (i.e., a computer program) or a web site. Advertisements on the Internet may be displayed using various presentation vehicles, such as pop-ups, pop-unders, and banners. Pop-ups are typically displayed over a web page to immediately attract an end-user's attention. Pop-unders, on the other hand, are displayed under a web page, and are not visible until the end-user closes the web page. Banners are typically displayed as part of a web page.

Generally speaking, the efficacy of an advertising campaign on the Internet may be measured in terms of "click-through" rate, which takes into account the number of times an advertisement has been clicked on (e.g., using a mouse) by end-users. The higher the click-through rate, the more effective the advertising. Because effective advertising results in higher revenue not only for manufacturers of products being advertised but also for companies who display the advertisements, increasing click-through rates is generally desirable.

To increase the chance of an end-user clicking on an advertisement, advertisers have developed "targeting techniques" to match advertisements with particular end-users. For example, some web sites employ cookies to keep track of end-user purchasing activity on the web site. This allows a web site to advertise, to an end-user, products that are related to those previously purchased by the end-user. A specific example of this targeting technique is to advertise a romance novel to an end-user who has previously purchased books in the same category. Some advertisers also develop end-user profiles that are based on demographic information. An advertiser may use an end-user profile to identify advertisements that may be of interest to a particular end-user.

SUMMARY

The present invention relates to presentation of information in a computer network. The present invention may be employed in various applications including advertising in a computer network such as the Internet, for example.

In one embodiment, a first search result responsive to a first search request is displayed in a presentation vehicle that is separate from a browser employed by an end-user to submit the first search request. The presentation vehicle may be a pop-under, for example. Upon detection of a second search request submitted by the end-user, the same presentation vehicle may be updated to display a second search result. This advantageously minimizes proliferation of presentation vehicles on the end-user's computer screen.

In another embodiment, a presentation vehicle is employed to display a first content responsive to a first end-user behavior. An end-user behavior may be an activity that an end-user engages in while on a computer network. The end-user behavior may be navigation from one web site to another web site or submission of a search request, for example. The presentation vehicle may be updated to display a second content in response to a second end-user behavior.

In exemplary embodiments, a method includes receiving from a message delivery program on a client computer a first keyword submitted by a web browser on the client computer to an original search engine, the original search engine not being a part of the server computer, the web browser being separate from the message delivery program and providing the client computer a first search result that is different from a search result provided by the original search engine. The method may further comprise receiving from the client computer a second keyword submitted to the original search engine, and providing the client computer a second search result that is different from another search result provided by the original search engine. The first search result may be displayed in a presentation vehicle that is updated to display the second search result. Further, the presentation vehicle comprises a pop-under.

An exemplary apparatus for receiving information over a computer network comprises a client computer configured to submit, by a browser, a first search request and to receive a first search result and a second search result responsive to the first search request, the first search result to be displayed in a first window and a second search result to be displayed in a second window, the first window being displayed in the browser, the second window being displayed in a presentation vehicle separate from the browser.

The second window may be displayed under the first window. The client computer may be further configured to receive a third search result that is responsive to another search request, the third search result is to be displayed in the second window. The first window may comprise a web browser pointed to a search engine and the second window comprises a pop-under.

An exemplary apparatus for receiving information over the Internet comprises a client computer configured to display a search result in a pop-under.

A exemplary method of presenting information to an end-user in a computer network comprises detecting a first end-user behavior in a browser, displaying a first content in a presentation vehicle separate from the browser, the first content being responsive to the first end-user behavior, detecting a second end-user behavior, and updating the presentation vehicle with a second content responsive to the second end-user behavior.

The first end-user behavior may comprise submitting a first search request and the second end-user behavior comprises submitting a second search request. The first content may comprise a first search result and the second content comprises a second search result. The first end-user behavior may comprise navigating to a first web page and the second end-user behavior comprises navigating to a second web page.

In various embodiments, a computer readable medium comprises executable instructions. The instructions executable may by a processor to perform a method. The method may comprise receiving from a message delivery program on a client computer a first keyword submitted by a web browser on the client computer to an original search engine, the original search engine not being a part of the server computer, the web browser being separate from the message delivery program and providing the client computer a first search result that is different from a search result provided by the original search engine.

The method may further comprise receiving from the client computer a second keyword submitted to the original search engine and providing the client computer a second search result that is different from another search result provided by the original search engine.

The first search result may be displayed in a presentation vehicle that is updated to display the second search result. The presentation vehicle may comprise a pop-under.

In some embodiments, a computer readable medium comprises executable instructions. The instructions executable may by a processor to perform a method. The method may comprise detecting a first end-user behavior in a browser, displaying a first content in a presentation vehicle separate from the browser, the first content being responsive to the first end-user behavior, detecting a second end-user behavior, and updating the presentation vehicle with a second content responsive to the second end-user behavior.

The first end-user behavior may comprise submitting a first search request and the second end-user behavior comprises submitting a second search request. The first content may comprise a first search result and the second content may comprise a second search result. The first end-user behavior may comprise navigating to a first web page and the second end-user behavior comprises navigating to a second web page.

These and other features of the present invention will be readily apparent to persons of ordinary skill in the art upon reading the entirety of this disclosure, which includes the accompanying drawings and claims.

DESCRIPTION OF THE DRAWINGS

FIG. 4B shows the web browser of FIG. 4A after a search.

The use of the same reference label in different drawings indicates the same or like components.

DETAILED DESCRIPTION

In the present disclosure, numerous specific details are provided such as examples of systems, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

It is to be noted that although embodiments of the present invention are described herein in the context of the Internet, the present invention is not so limited and may be used in other data processing applications.

Figure 1:
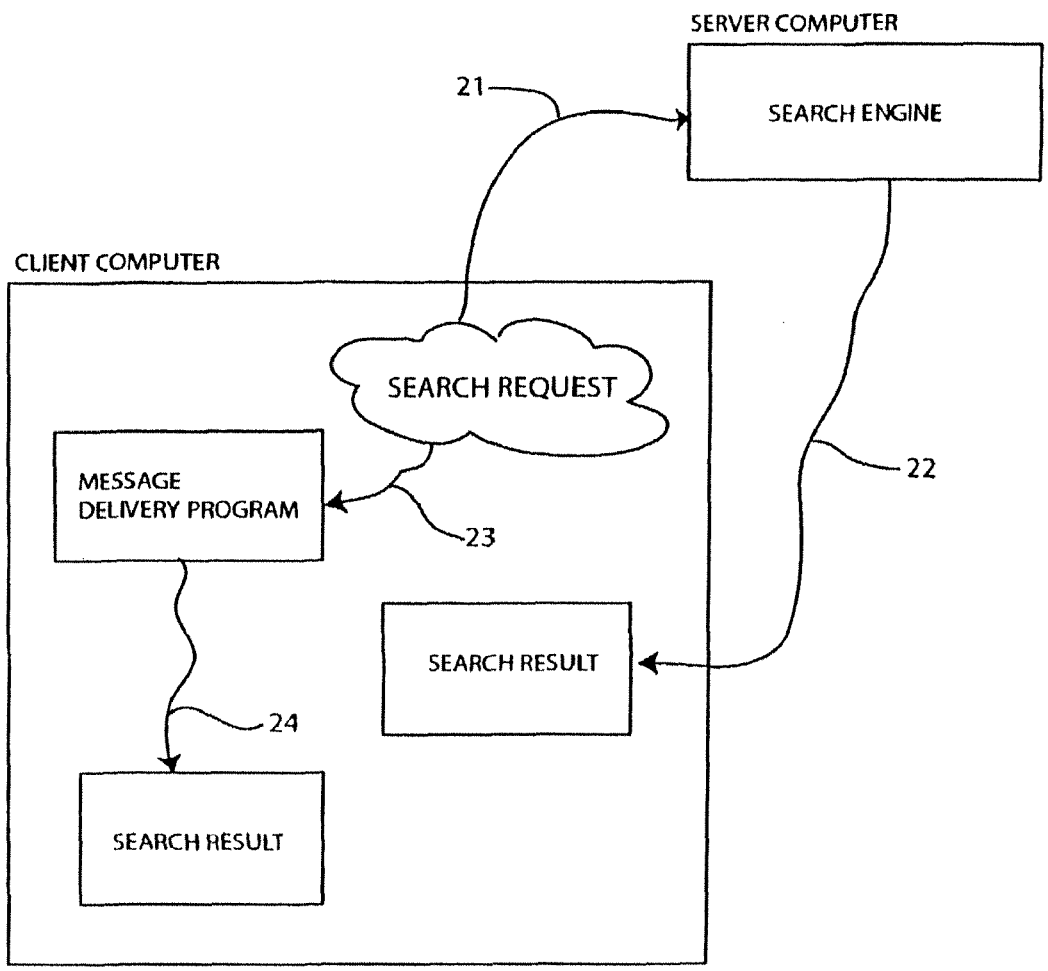
FIG. 1 schematically illustrates an embodiment of the present invention.

An embodiment of the present invention is schematically illustrated in FIG. 1. In FIG. 1, an end-user on a client computer submits a search request to a search engine (hereinafter referred to as "original search engine") on the Internet (see arrow 21). The original search engine may perform an "Internet search", or a search limited to a particular web site or domain name. The search request may be a query comprising one or more keywords, for example. The original search engine responds to the search request by sending a search result to the client computer (see arrow 22). The search result may include a list of documents (e.g., web pages), links to documents, or other information relating to the keywords. A specific example of the just described scenario is an end-user typing the keyword "car" in a search engine and receiving back links to web sites that talk about car clubs, exotic cars, car racing, and like information.

A search request is an express manifestation of end-user interest in something. That is, an end-user requesting information about a topic has expressed an interest in that topic. To take advantage of this, a message delivery program resident in the client computer listens for requests for information such as a search request. When the message delivery program detects that an end-user is performing a search (see arrow 23), the message delivery program responds to the search request by displaying its own search result in the client computer (see arrow 24). The search result of the message delivery program may be displayed in a window that is under a window containing the search result from the original search engine, for example. The search result of the message delivery program may include information cached in the client computer, served by a server computer (e.g., an adserver), or provided by another search engine, for example. The search result displayed by the message delivery program may contain advertisements relating to the keyword included in the end-user's search request. Because the advertisements relate to the end-user's search request, the probability that the end-user will be interested in one or more of the advertisements is thus improved. In the car example, the message delivery program may compile a list of car-related advertisements and display them to the end-user.

Preferably, the message delivery program is resident in the client computer so that it can respond to an end-user's search request even when the end-user uses different search engines. That is, unlike other targeting techniques that only work when an end-user is on a particular web site, embodiments of the present invention may work across different web sites. An end-user may obtain the message delivery program by itself or along with free or reduced-cost computer programs, services, and other products.

Figure 2:
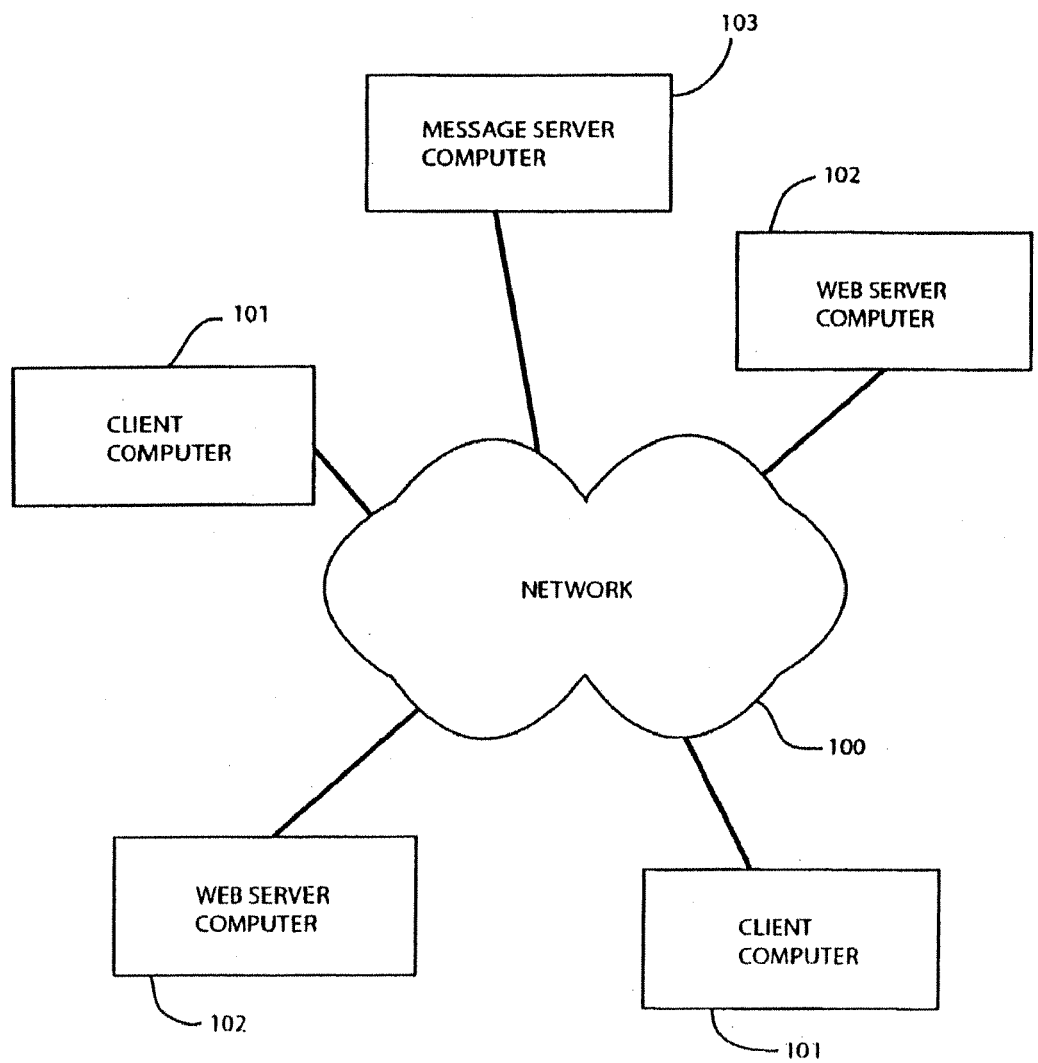
FIG. 2 shows a schematic diagram of a computer network in accordance with an embodiment of the present invention.

Referring now to FIG. 2, there is shown a schematic diagram of a computer network 100 in accordance with an embodiment of the present invention. Network 100 may include one or more client computers 101, one or more web server computers 102, one or more message server computers 103, and other computers not shown. Intermediate nodes such as gateways, routers, bridges, Internet service provider networks, public-switched telephone networks, proxy servers, firewalls, and other network components are not shown for clarity. In the example of FIG. 2, network 100 includes the Internet; however, other types of computer networks may also be used. Computers may be coupled to network 100 using any type of connection without detracting from the merits of the present invention.

A client computer 101 is typically, but not necessarily, a personal computer such as those running the Microsoft Windows™, Apple Macintosh™, Linux, or UNIX operating systems. An end-user may employ a suitably equipped client computer 101 to get on network 100 and access computers coupled thereto. For example, a client computer 101 may be used to access web pages from a web server computer 102. It is to be noted that as used in the present disclosure, the term "computer" includes any type of data processing device including personal digital assistants, digital telephones, wireless terminals, and the like.

A web server computer 102 may be a web site containing information designed to attract end-users surfing on the Internet. A web server computer 102 may also include advertisements, downloadable computer programs, a search engine and products available for online purchase. A web server computer 102 may also be an ad server for delivering advertisements to a client computer 101.

A message server computer 103 may include the functionalities of a web server computer 102. Additionally, in one embodiment, a message server computer 103 may also include message units for delivery to a client computer 101. The message units may contain advertisements, for example. Message units are further described below. A message server computer 103 may also include downloadable computer programs and files for supporting, updating, or maintaining components in a client computer 101.

Web server computers 102 and message server computers 103 are typically, but not necessarily, server computers such as those available from Sun Microsystems, Hewlett-Packard, or International Business Machines. A client computer 101 may communicate with a web server computer 102 or a message server computer 103 using client-server protocol. It is to be noted that client-server computing is well known in the art and will not be further described here.

Figure 3:
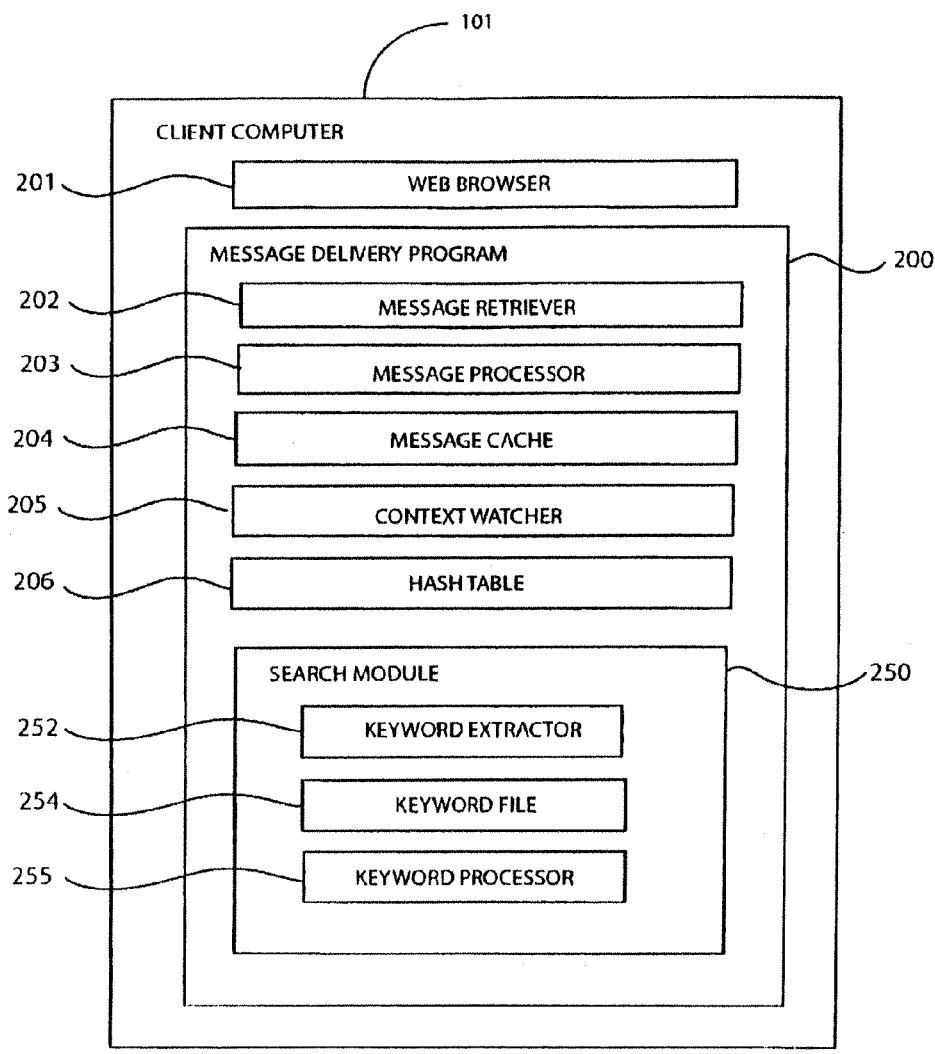
FIG. 3 shows a schematic diagram of a client computer in accordance with an embodiment of the present invention.

FIG. 3 schematically illustrates the components of a client computer 101 in accordance with an embodiment of the present invention. In one embodiment, the components of client computer 101 shown in FIG. 3 are implemented in software. It should be understood, however, that components in the present disclosure may be implemented in hardware, software, or a combination of hardware and software (e.g., firmware). Software components may be in the form of computer-readable program code stored in a computer-readable storage medium such as memory, mass storage device, or removable storage device. For example, a computer-readable medium may comprise computer-readable code for performing the function of a particular component. Likewise, computer memory may be configured to include one or more components, which may then be run by a microprocessor. Components may be implemented separately in multiple modules or together in a single module.

As shown in FIG. 3, client computer 101 may include a web browser 201 and a message delivery program 200. Web browser 201 may be a commercially available web browser or web client running on a client computer 101. In one embodiment, web browser 201 is the Microsoft Internet Explorer™. web browser.

In one embodiment, message delivery program 200 is downloadable from a message server computer 103. Message delivery program 200 may be downloaded in conjunction with the downloading of another computer program. For example, message delivery program 200 may be downloaded to a client computer 101 along with a utility program that is provided free of charge or at a reduced cost. The utility program may be provided to an end-user in exchange for the right to deliver messages to the end-user via message delivery program 200. In essence, revenue (e.g., advertising fees) from messages delivered to the end-user helps defray the cost of creating and maintaining the utility program.

Message delivery program 200 may include a message retriever 202, a message processor 203, a message cache 204, a context watcher 205, a hash table 206, and a search module 250. Other components such as operating system components, utility programs, application programs, and the like are not shown for clarity of illustration.

Message retriever 202 may include computer-readable program code for requesting message units from message server computer 103. As will be explained later on in connection with FIG. 5, a message unit may include a message content. A message content may include, without limitation, information to be displayed on a computer screen, audio to be played, or computer-readable program code (e.g., Java applet, script, HTML, hyperlink, pointer to a web page containing a search result). In one embodiment, a message unit may be a rules message unit or a search message unit. A search message unit may be distinguished from a rules message unit by a field in the message unit referred to as a "search field" (see search field 352 in FIG. 5). A rules message unit is processed when a set of rules has been satisfied, whereas a search message unit is processed when the end-user performs a search using certain keywords. Message units are processed according to their message contents. For example, a message unit containing displayable message content is processed by displaying its message content on a computer screen, a message unit whose message content includes computer-readable program code is processed by running its message content, and so on.

Still referring to FIG. 3, message retriever 202 monitors web browser 201 for the uniform resource locator (URL) of web sites visited by an end-user surfing on the Internet. For each domain visited by an end-user, message retriever 202 may send a request packet to message server computer 103. In one embodiment, a request packet includes:

(a) the end-user's unique identification (ID) number;
(b) the ID number of client computer 101;
(c) the local time;
(d) the domain name of the web site visited by the end-user; and
(e) a list of message units stored in message cache 204.

In one embodiment, personal information such as the actual name of the end-user, credit card information, residence address, and the like is stored solely in client computer 101 to protect the end-user's privacy.

Message server computer 103 checks if there is a corresponding message unit for each request packet received from client computer 101. If so, message server computer 103 sends the corresponding message unit to client computer 101. For example, message retriever 202 may send a request packet to message server computer 103 as an end-user navigates from "storekeeper.com" to "cars.com." If a message unit is available for the domain "cars.com", message server computer 103 will send that message unit to client computer 101.

Client computer 101 may also include a hash table 206. Hash table 206 may contain information for determining whether a message unit is available for a particular domain. This allows message retriever 202 to first query hash table 206 before sending a request packet to message server computer 103. If hash table 206 indicates that there is a message unit for a domain visited by the end-user, message retriever 202 may proceed to send a request packet to message server computer 103. Otherwise, message retriever 202 may not send a request packet, thereby minimizing the amount of request packets sent to and processed by message server computer 103.

Message processor 203 may include computer-readable program code for processing a message unit. Message processor 203 may process a message unit by displaying its message content. Message processor 203 may display a message content using a variety of presentation vehicles including pop-ups, pop-unders, banners, message boxes, text boxes, sliders, separate windows, windows embedded in a web page, and other mechanisms for displaying information. Message processor 203 may also process a message unit by playing its message content if the message content is audio or video, or by running its message content if the message content is computer-readable program code, for example. As an example, message processor 203 may process a message unit by displaying a pop-under (or other presentation vehicle) pointed to a web page containing a search result.

Context watcher 205 may include computer-readable program code for determining if a message unit has been triggered for processing. Context watcher 205 checks message cache 204 for rules message units whose rules have been satisfied and search message units that relate to an end-user's search request. If context watcher 205 finds such a rules message unit or a search message unit, context watcher 205 alerts message processor 203 to process the message unit.

Message delivery program 200 further includes a search module 250. In one embodiment, search module 250 includes the following components: a keyword extractor 252, a keyword file 254, and a keyword processor 255.

Keyword extractor 252 may include computer-readable program code for parsing a search request. In one embodiment, keyword extractor 252 parses a search request to extract one or more keywords from a URL displayed in the address window of a web browser in response to a search request by an end-user. Popular search engines respond to a search request by pointing the web browser employed by the end-user to a web page containing the search result. The URL of that web page may be parsed to extract the keywords chosen by the end-user for his search. For example, performing a search for "hotrod" and "car" in a fictitious search engine referred to herein as "finderskeepers.com" will result in a web browser being pointed to a web page with the following URL:

http://search.finderskeepers.com/bin/search?p=hotrod+car

The web page with the URL "http://search.finderskeepers.com/bin/search?p=hotrod+car" contains the search result for the keywords "hotrod" and "car". Knowing the URL format employed by finderskeepers.com allows extraction of the words following ". . . search?p=" and separated by "+". String manipulation functions may be used to extract keywords from the URL. It is to be noted that different search engines may employ different URL formats. Accordingly, keyword extractor 252 may first parse the URL to determine the name of the search engine, and then employ parsing rules for that search engine. In the present example, keyword extractor 252 may first parse the URL "http://search.finderskeepers.com/bin/search?p=hotrod- +car" to get the name of the search engine, which is ". . . finderskeepers.com/ . . . ", and then apply parsing rules for finderskeepers.com. Keyword extractor 252 may take advantage of delimiters and end of string indicators employed by a particular search engine to parse a URL. In one embodiment, keyword extractor 252 includes parsing rules for popular search engines.

Figure 4A:
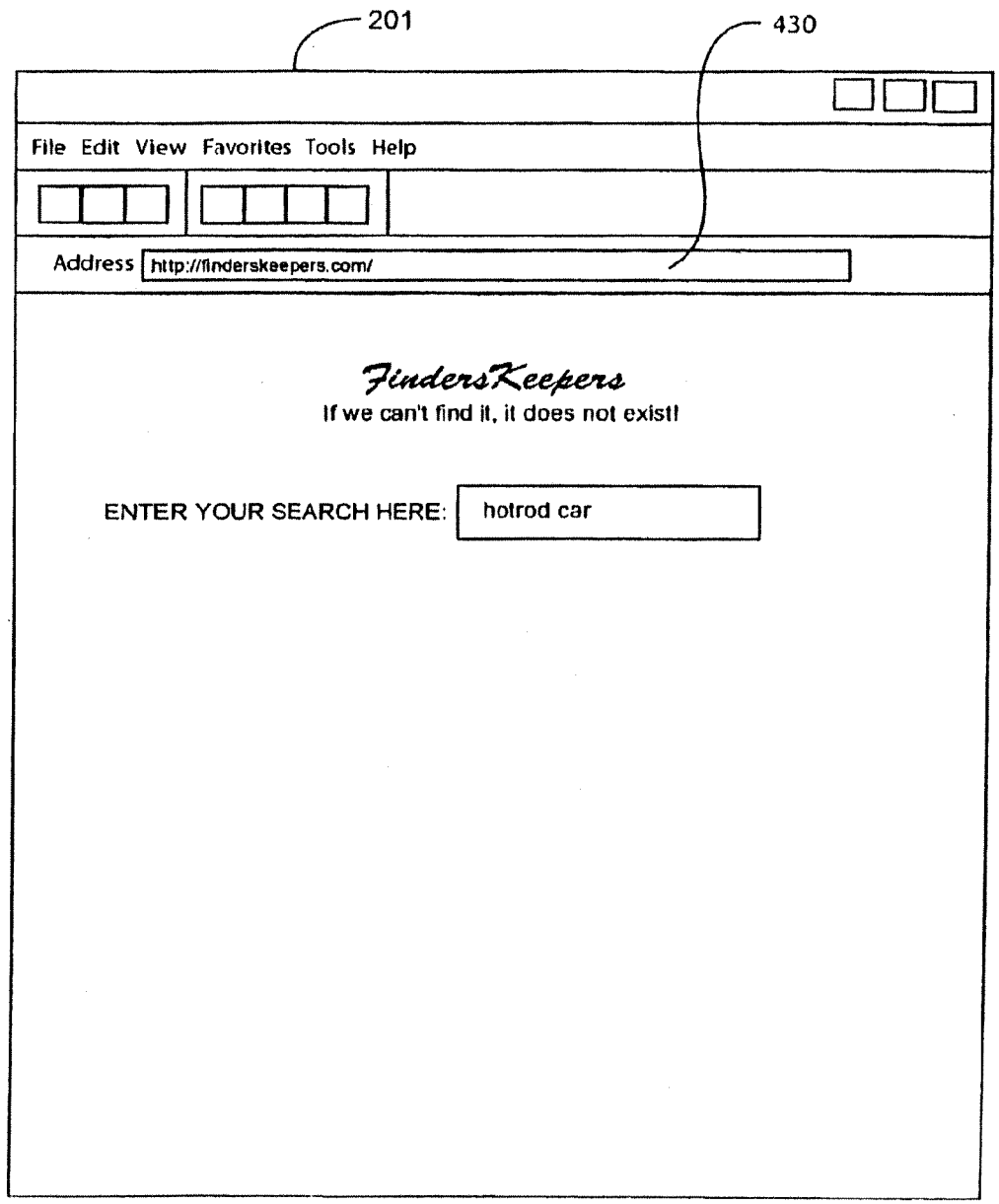
FIG. 4A shows a web browser pointed to an Internet search engine.

FIG. 4A shows a web browser 201 pointed to the URL indicated in address window 430. In the example of FIG. 4A, web browser 201 is pointed to finderskeepers.com where an end-user is searching for information about hotrods and cars. FIG. 4B shows web browser 201 and address window 430 after the search using the keywords "hotrod" and "car".

Referring back to FIG. 3, search module 250 also includes a keyword file 254. In one embodiment, keyword file 254 is a text file containing a list of relevant keywords referred to as "an include list" and a list of non-relevant keywords referred to as an "exclude list". Note that keyword file 254 may have also have an include list but not an exclude list or vice versa. Keyword file 254 may be downloadable from message server computer 103 to ensure that client computer 101 always has the most current keyword file. Keywords in the include list have corresponding message units, whereas keywords in the exclude list have no corresponding message units. As will be explained later below, keywords in the include list are processed by keyword processor 255, whereas keywords in the exclude list are not processed. In one embodiment, keyword processor 255 processes a keyword by sending the keyword to message server computer 103 to obtain further information about the keyword. By first examining the exclude list before sending keywords to message server computer 103, keywords that have no corresponding message units are identified at client computer 101, thereby minimizing traffic to message server computer 103. Likewise, traffic to message server computer 103 may be minimized by first determining if a keyword is in the include list before sending the keyword to message server computer 103. Table 1 shows the contents of an example keyword file 254.

TABLE 1

| Include List | Exclude List |
| --- | --- |
| hotrod | paper |
| car | the |
| books | for |
| computer | Britney |
| cellular | ... |
| sports | ... |
| wine | ... |
| ... | ... |

In the example of Table 1, the exclude list includes non-relevant words such as commonly used words that are too general to be useful. The exclude list may also include words that have no commercial value. For example, "Britney" may have no commercial value to most advertisers except those affiliated with or licensed by Britney the pop-star.

In the example of Table 1, the include list includes relevant words. In one embodiment, a word is considered relevant if there is a corresponding message unit for that word. For example, the word "computer" may be relevant if there is a message unit containing an advertisement for a personal computer. Similarly, the word "book" may be relevant if there is a message unit relating to books.

Still referring to FIG. 3, search module 250 includes keyword processor 255. Keyword processor 255 may include computer-readable program code for processing a keyword. In one embodiment, a keyword may be processed by determining if a keyword is relevant and working with message server computer 103 to identify message units 301 that relate to the keyword. Keyword processor 255 is further described in connection with FIG. 6.

Figure 5:
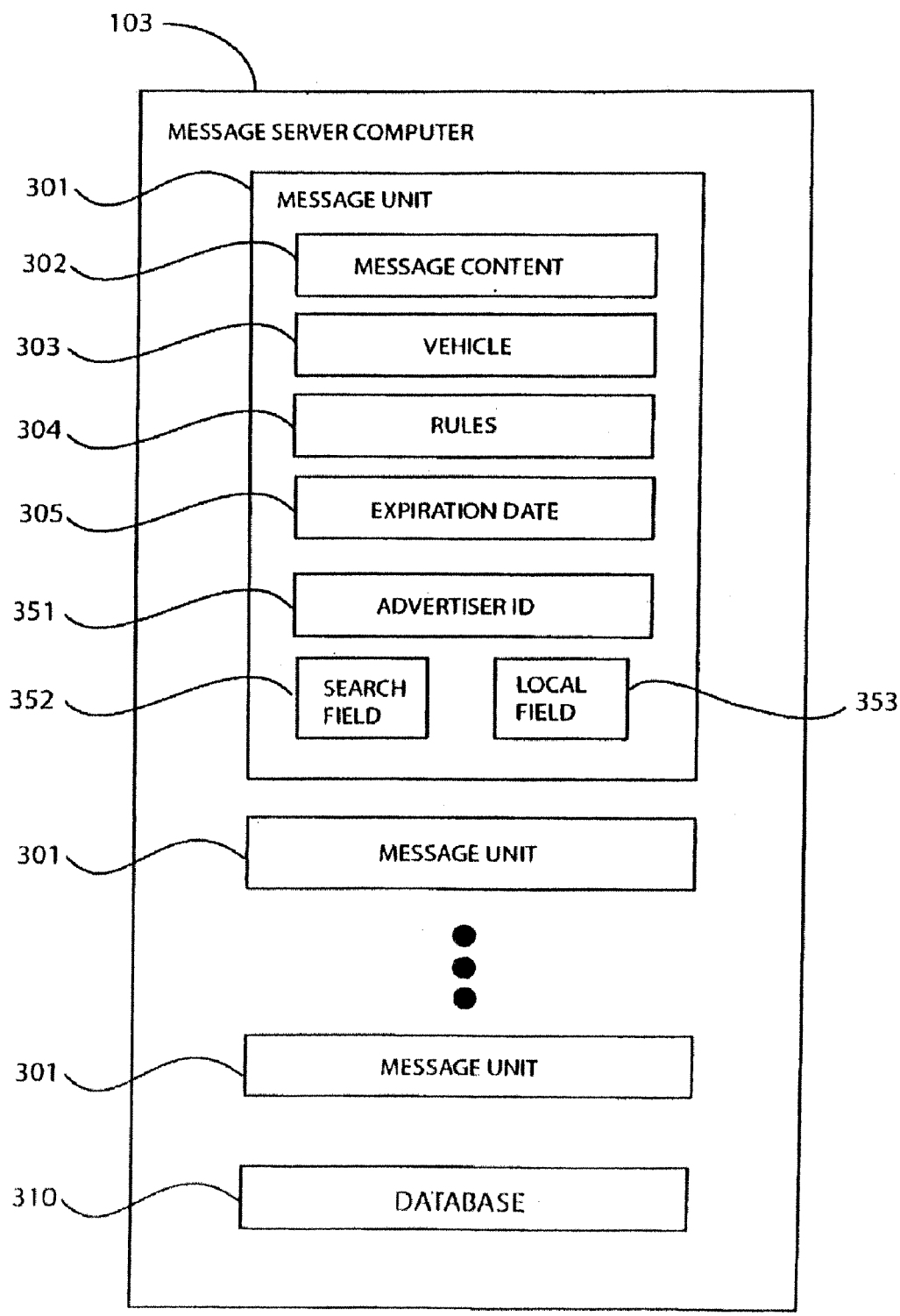
FIG. 5 shows a schematic diagram of a message server computer in accordance with an embodiment of the present invention.

FIG. 5 schematically illustrates the components of a message server computer 103 in accordance with an embodiment of the present invention. As mentioned, message server computer 103 receives request packets from a client computer 101. Each received request packet may include the domain name of the web site visited by an end-user. Message server computer 103 uses the domain name to find all message units available for that web site. For example, a message unit may contain an advertisement for a car company that wants to display its advertisement to end-users visiting car-related web sites, such as the "cars.com" web site. When a request packet indicates that an end-user is on "cars.com", the message unit containing the car company's advertisement will be sent to the requesting client computer 101.

A message server computer 103 may include one or more message units 301 and a database 310. Database 310 may be a commercially available database program. Database 310 is used to keep track of message units 301 and keyword related information in message server computer 103. For example, message server computer 103 may query database 310 for all message units 301 available for a particular web site.

A message unit 301 may include a message content 302, a vehicle 303, rules 304, an expiration date 305, an advertiser ID 351, a search field 352, and a local field 353. Message content 302 may include computer-readable program code, text, images, audio, video, hyperlink, and other information. A message content 302 may be an advertisement or a search result (or pointers thereto) to be displayed on a computer screen, for example.

Vehicle 303 indicates the presentation vehicle to be used in presenting message content 302 to an end-user. For example, vehicle 303 may call for the use of a pop-up, pop-under, banner, message box, text box, slider, separate window, window embedded in a web page, and the like.

A message unit 301 may include a search field 352. A search field 352 may be a Boolean variable for indicating whether a message unit 301 is a rules message unit or a search message unit. In one embodiment, a message unit 301 is a rules message unit when search field 352 is set to logical FALSE; otherwise, the message unit 301 is a search message unit.

As will be explained further below, a message unit 301 may include a local field 353 for indicating whether a keyword is to be evaluated against a local include list only.

A message unit 301 may include rules 304 for specifying the conditions that need to be satisfied before the message unit is triggered for processing. Rules 304 may specify to display a message content 302 when an end-user navigates to a specific web page or as soon as the message unit 301 is received in a client computer 101. For example, a car company may contract with the operator of a message server computer 103 to deliver a message unit 301 containing an advertisement for a minivan (hereinafter, "minivan message unit"). The rules 304 of the minivan message unit may specify that the minivan advertisement is to be displayed to end-users viewing the minivan web page of "cars.com". In this example, the minivan web page of cars.com has the URL "www.cars.com/minivans". When an end-user visits the main page (or any web page) of "cars.com", message retriever 202 (see FIG. 3) will send a request packet to message server computer 103 indicating that the end-user is on "cars.com". In response, message server computer 103 will send the minivan message unit to client computer 101. When the end-user navigates to the URL "www.cars.com/minivans", context watcher 205 will detect that the minivan message unit has been triggered for display (i.e., rules 304 of the minivan message unit have been satisfied). Context watcher 205 will accordingly inform message processor 203, which will then process the minivan message unit by displaying its message content.

Rules 304 may also include: (a) a list of domain names at which the content of a message unit 301 is to be displayed, (b) URL sub-strings that will trigger displaying of the content of the message unit 301, and (b) time and date information. As can be appreciated, rules 304 may also be extended to take into account additional information relating to an end-user (as identified by a corresponding end-user ID) such as the end-user's frequent flyer affiliation, club memberships, type of credit card used, hobbies and interests, and basic demographic information. End-user related information may be stored in client computer 101 or database 310 of message server computer 103. End-user related information may be used for targeted advertising purposes, for example.

As shown in FIG. 5, a message unit 301 may also include an expiration date 305. Expiration date 305 indicates the latest date and time the message unit 301 can still be displayed. Expired message units 301 do not have to be processed and may be removed from client computer 101.

A message unit 301 may include an advertiser ID 351 for identifying a particular search message unit. Note that an advertiser ID 351 does not necessarily have to be associated with an advertiser. Additionally, an advertiser ID 351 does not necessarily have to identify a message unit 301 that contains advertising. That is, an advertiser ID 351 may be used to keep track of message units 301 in general.

Other techniques for receiving and processing message units are also described in the following commonly-assigned disclosure, which is incorporated herein by reference in its entirety: U.S. application Ser. No. 10/152,204, filed on May 21, 2002, by Scott G. Eagle, David L. Goulden, Anthony G. Martin, and Eugene A. Veteska, issued Jun. 27, 2006 as U.S. Pat. No. 7,069,515.

Figure 6A:
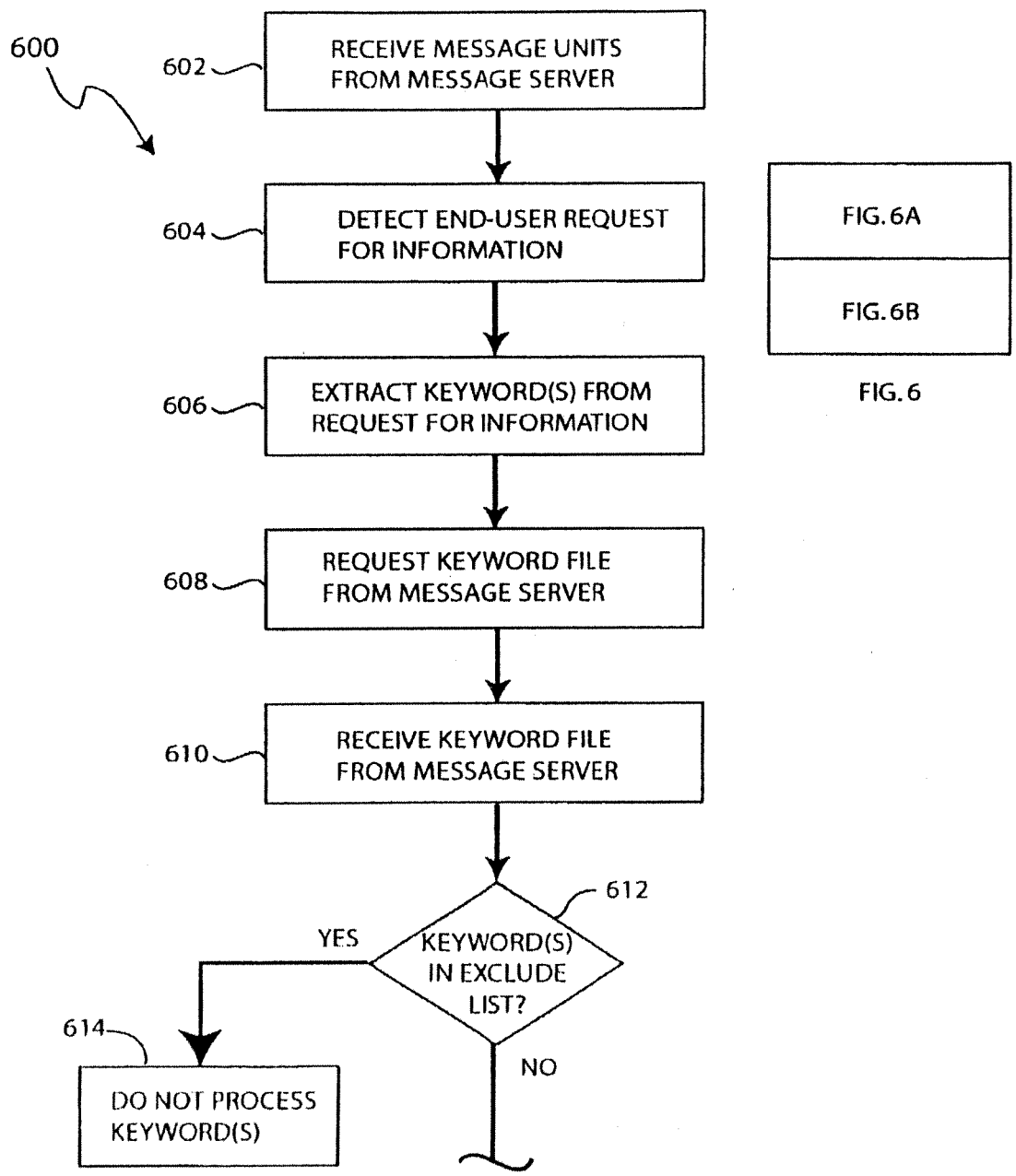
FIG. 6, which consists of FIGS. 6A and 6B, shows a flow diagram of a method of responding to an end-user request for information in accordance with an embodiment of the present invention.
Figure 6B:
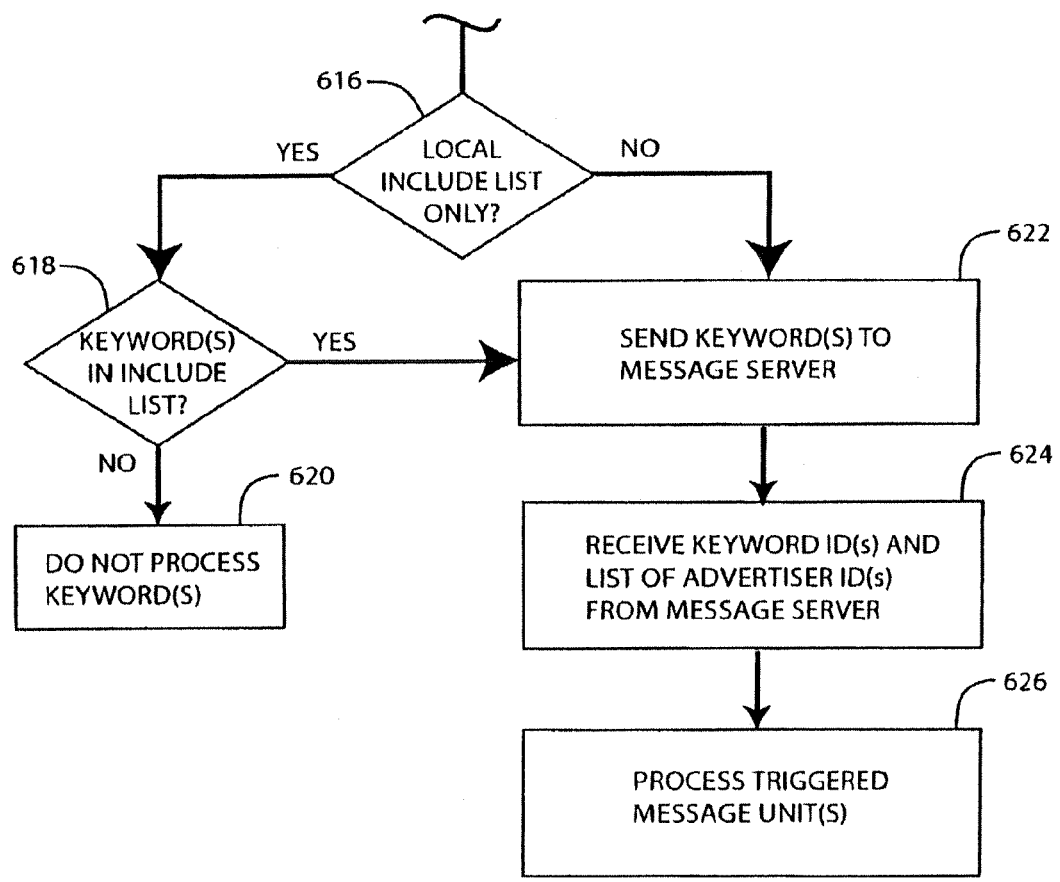

FIG. 6, which consists of FIGS. 6A and 6B, shows a flow diagram of a method 600 of responding to end-user request for information in accordance with an embodiment of the present invention. The steps of method 600 are described herein using the aforementioned components of client computer 101 and message server computer 103 as an example. However, it should be understood that method 600 is not so limited and may also be implemented using other components.

Beginning in step 602, one or more message units 301 are received in client computer 101 from message server computer 103. In one embodiment, a message unit 301 is received in client computer 101 in response to an end-user navigating to a particular web site. That particular web site may include a search engine, for example. Navigation to a web site that has a search engine indicates that the end-user is intending to perform a search, and thus causes delivery of search message units intended for that web site. Message retriever 202 monitors web browser 201 for the URL of web sites visited by the end-user, and accordingly asks message server computer 103 for message units available for each web site, if any. Message units 301 received from message server computer 103 may be stored in message cache 204. As mentioned, a message unit 301 may be a rules message unit or a search message unit depending on the state of its search field 352 (see FIG. 5).

In step 604, message retriever 202 detects an end-user request for information and so informs keyword processor 255. An example end-user request for information is a search request submitted to an Internet search engine. In one embodiment, a search request is detected by monitoring an address window of a web browser (e.g., see address window 430 shown in FIG. 4A) for a URL with the string "search" in it (e.g., "... search.domain_name/...") or a domain name of a known search engine. It is to be noted that the mechanics of monitoring an end-user's browsing activity, such as determining where an end-user is navigating to, what an end-user is typing on a web page, when an end-user activates a mouse or keyboard, and the like, is, in general, known in the art and is not further described here.

In step 606, keyword extractor 252 extracts one or more keywords from the end-user request for information. The keywords may be words employed in a search request submitted to a search engine. In one embodiment, keywords are extracted by parsing a URL appearing in an address window of a web browser after the submission of a search request.

In step 608, keyword processor 255 requests message server computer 103 to send a keyword file 254 to client computer 101. A keyword file 254 may be periodically downloaded from message server computer 103 to ensure that the keywords contained therein are current. Depending on the application, a keyword file 254 may also be downloaded once upon installation of message delivery program 200 in client computer 101, or from time to time but not necessarily every time an end-user navigates to a new web site.

In step 610, client computer 101 receives a keyword file 254 from message server computer 103. An include list in a keyword file 254 in client computer 101 is also referred to as a "local include list".

In step 612, keyword processor 255 determines if a keyword extracted from a search request is in an exclude list of keyword file 254. If the keyword is in the exclude list, the keyword is not deemed relevant and accordingly ignored by keyword processor 255. Processing of the keyword continues to step 616 if the keyword is not in the exclude list.

In step 616, keyword processor 255 determines if it is supposed to limit its determination of whether the keyword is relevant or not to an include list locally available in a keyword file 254 in client computer 101 (instead of in message server computer 103). Whether or not keyword processor 255 should only consult a local include list may be determined by examining local field 353 of a search message unit 301. Limiting keyword processor 255 to a local include list advantageously minimizes traffic to message server computer 103.

In steps 616, 618, and 620, the keyword is not processed if keyword processor 255 is limited to a local include list and the keyword is not in that local include list. For example, if local field 353 of a search message unit 301 indicates that only a local include list is to be consulted and the keyword is not in the local include list, that particular search message unit 301 will not be triggered for processing.

In step 622, keyword processor 255 sends the keyword to message server computer 103 if keyword processor 255 is not limited to a local include list (step 616 to step 622). Keyword processor 255 also sends the keyword to message server computer 103 if keyword processor 255 is limited to a local include list and the keyword is in that local include list. Message server computer 103 receives the keyword and then employs database 310 (see FIG. 5) to identify search message units 301 in client computer 101 that relate to the keyword and accordingly may need to be processed In step 624, client computer 101 receives a keyword ID and a list of advertiser IDs from message server computer 103, if any. The list of advertiser IDs identify search message units 301 that relate to the keyword. For example, if the keyword is "car" and there is a search message unit 301 containing an advertisement for a car company who is interested in search requests with the word "car" in it, the advertiser ID for that search message unit 301 is sent by message server computer 103 to client computer 101. The keyword ID is an arbitrarily assigned identification for the keyword. The keyword ID may be used for statistical and logging purposes (e.g., how many times the word "car" appeared in a search request). Search message units 301 in client computer 101 whose advertiser IDs match those in the list of advertiser IDs received from message computer 103 are deemed triggered for processing.

In step 626, context watcher 205 identifies the triggered search message units 301 and accordingly alerts message processor 203 to process them.

A triggered search message unit 301 with a displayable message content may be processed by displaying its content. A triggered search message unit 301 with an executable message content may be processed by running its content. For example, a search message unit 301 may include a hyperlink to the URL of one or more web pages designated to contain a search result for a particular keyword. As a further example, a message server computer 103, another search engine (i.e., not the "original" search engine the end-user is actively using), or both may perform a search for the keyword and post the search results on a designated web page pointed to by a search message unit 301 that has been triggered for processing. A message server computer 103 may request the other search engine to perform the search after the message server computer 103 receives the keyword from client computer 101 and deems the keyword relevant.

Figure 7:
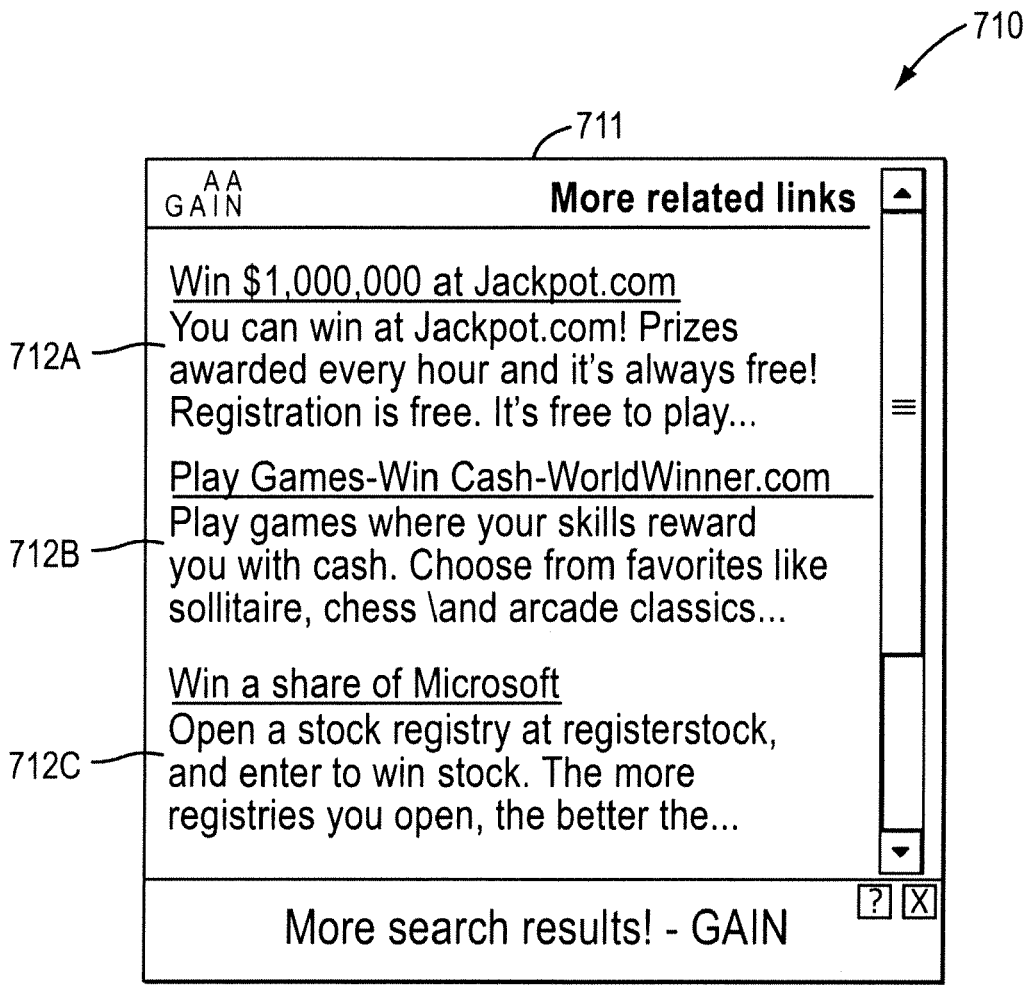
FIGS. 7 and 8 show search results in accordance with embodiments of the present invention.

FIG. 7 shows a search result 710 in accordance with an embodiment of the present invention. Search result 710 includes a window 711 containing items 712 (i.e., 712A, 712B, 712C, ...). Each item 712 may be the message content of a triggered search message unit 301. For example, item 712A may be from the message content of a triggered search message unit that relates to the keywords "money" and "cash". As another example, the contents of window 711 may also be from a web page pointed to by a hyperlink in a message content of a triggered search message unit 301; the web page pointed to by the hyperlink may contain the results of a search performed by another search engine.

Figure 8:
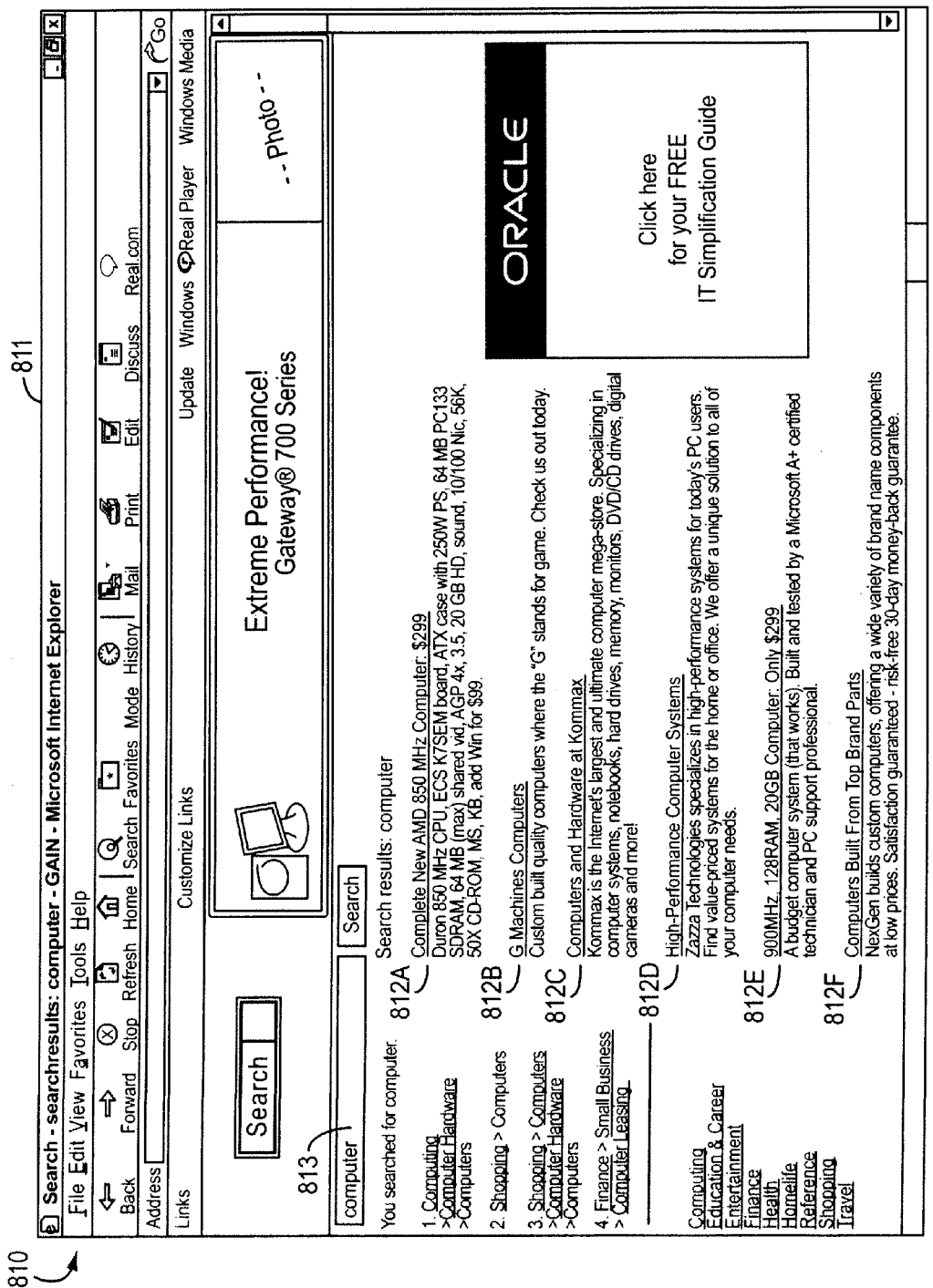

FIG. 8 shows a search result 810 in accordance with an embodiment of the present invention. Search result 810 includes a browser window 811 containing items 812 (i.e., 812A, 812B, 812C, . . . ). Each item 812 may be the message content of a triggered search message unit 301. For example, item 812A may be from the message content of a triggered search message unit 301 that relates to the keyword "computer." As discussed above, items 812 may also be from a search result of another search engine. Browser window 811 further includes a text box 813 containing the keyword "computer", which in this example was the keyword typed by an end-user in the original search engine (not shown) (i.e., the search engine the end-user is actively using). Keyword processor 255 may receive the keyword "computer" from keyword extractor 252, and then paste the keyword in text box 813. Search result 710 of FIG. 7 or search result 810 of FIG. 8 may be displayed on a computer screen under a browser window displaying search results from the original search engine, for example.

In another aspect of the present invention, a search result is displayed in an updateable presentation vehicle. The updateable presentation vehicle may be created once, and then refreshed with new search results as an end-user refines his search. This advantageously minimizes proliferation of presentation vehicles on a computer screen, thereby minimizing clutter and providing more relevant search results to end-users.

In one embodiment, an updateable presentation vehicle comprises a pop-under displayed under a web browser in response to an end-user's search request to an original search engine. The pop-under may contain a search result from another search engine. As the end-user refines his search, a client program (e.g., message delivery program 200) updates the same pop-under to contain the latest search results from the other search engine, for example. By using the same pop-under for subsequent search results, the number of pop-unders provided to the end-user is thus minimized.

FIGS. 9(a)-9(d) schematically illustrate a pop-under 910 (i.e., 910-1, 910-2, 910-3) in accordance with an embodiment of the present invention. In FIGS. 9(a)-9(d), pop-under 910 is labeled as 910-1, 910-2, or 910-3 to distinguish pop-under 910 according to its content. That is, 910-1, 910-2, and 910-3 refer to the same pop-under with different contents. Pop-under 910 may be any type of presentation vehicle that is not immediately available for viewing by the end-user. It should be noted, however, that the present invention is not limited to the use of pop-unders. As will be further described below, embodiments of the present invention may be adapted for use with other types of presentation vehicles.

Figure 9A:
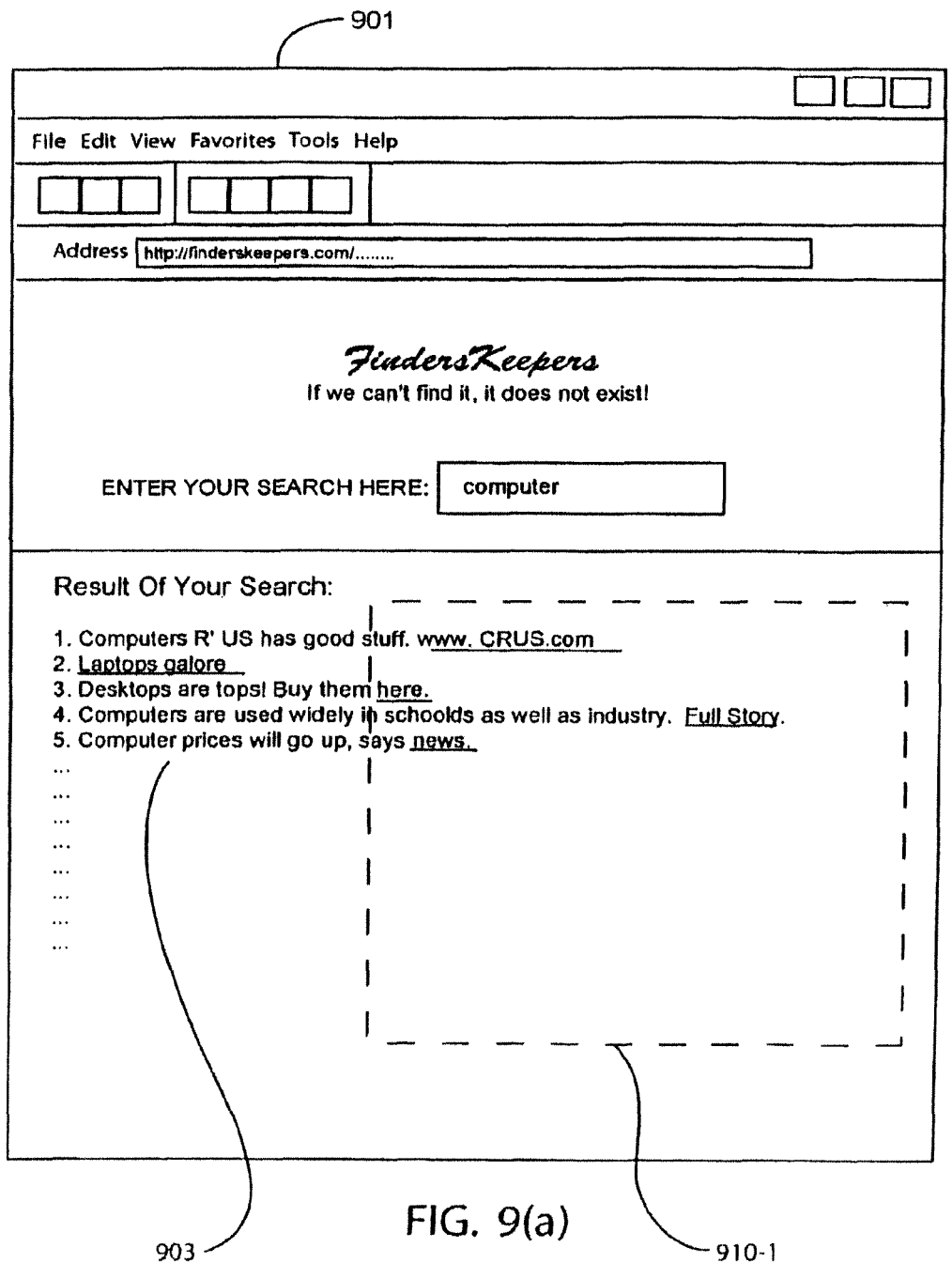
FIGS. 9($a$)-9($d$) schematically illustrate a pop-under in accordance with an embodiment of the present invention.

In FIG. 9(a), pop-under 910-1 is under a web browser 901. Web browser 901 may be a commercially available web browser such as the Microsoft Internet Explorer™. web browser, for example. Other types of windows capable of displaying information received over a computer network may also be used in lieu of a web browser.

Still referring to FIG. 9(a), web browser 901 contains a search result 903 that is in response to a search request submitted by the end-user to an original search engine. In this example, the original search engine is the fictitious search engine having the URL address "www.finderskeepers.com". Also in this example, the search request is for the keyword "computer". The original search engine performs a search for the keyword "computer", and provides search result 903. Note that search engines in general may comprise a single server computer or a network of server computers. For example, one server computer may be providing a user-interface or serve as a portal for the search engine, while another server computer may be performing the actual search.

As before, message delivery program 200 (see FIG. 3) initiates a search for the same keyword (i.e., "computer") and provides a search result that is displayed in pop-under 910-1. Message delivery program 200 may submit the keyword "computer" to another search engine (not the original search engine, which is finderskeepers.com in this example) that may post a search result on a web page. Message delivery program 200 may then display pop-under 910-1 such that it is pointed to that web page containing the search result.

It is to be noted that as used in the present disclosure, the terms "over", "overlying", "under", and "underlying" refer to the placement of a window that may or may not be directly above or below another window on a computer screen. For example, another window, such as another web browser or a folder, may be placed between web browser 901 and pop-under 910-1. Pop-under 910 is depicted in FIGS. 9(a), 9(b), and 9(c) with a dashed line to indicate that it is under web browser 901.

In the prior art, pop-unders are not normally used for displaying search results. This may be because a search result is typically something an end-user requests for, and is thus conventionally thought of as having to be displayed for immediate viewing by the end-user. In embodiments of the present invention, a pop-under advantageously provides an end-user a second search result while minimizing interruptions to the end-user by displaying the pop-under for later viewing. The second search result may be from search engines not necessarily affiliated with the original search engine. Thus, the search result from the original search engine will most likely be different from the second search result displayed in the pop-under, providing the end-user with a more comprehensive search.

Figure 9B:
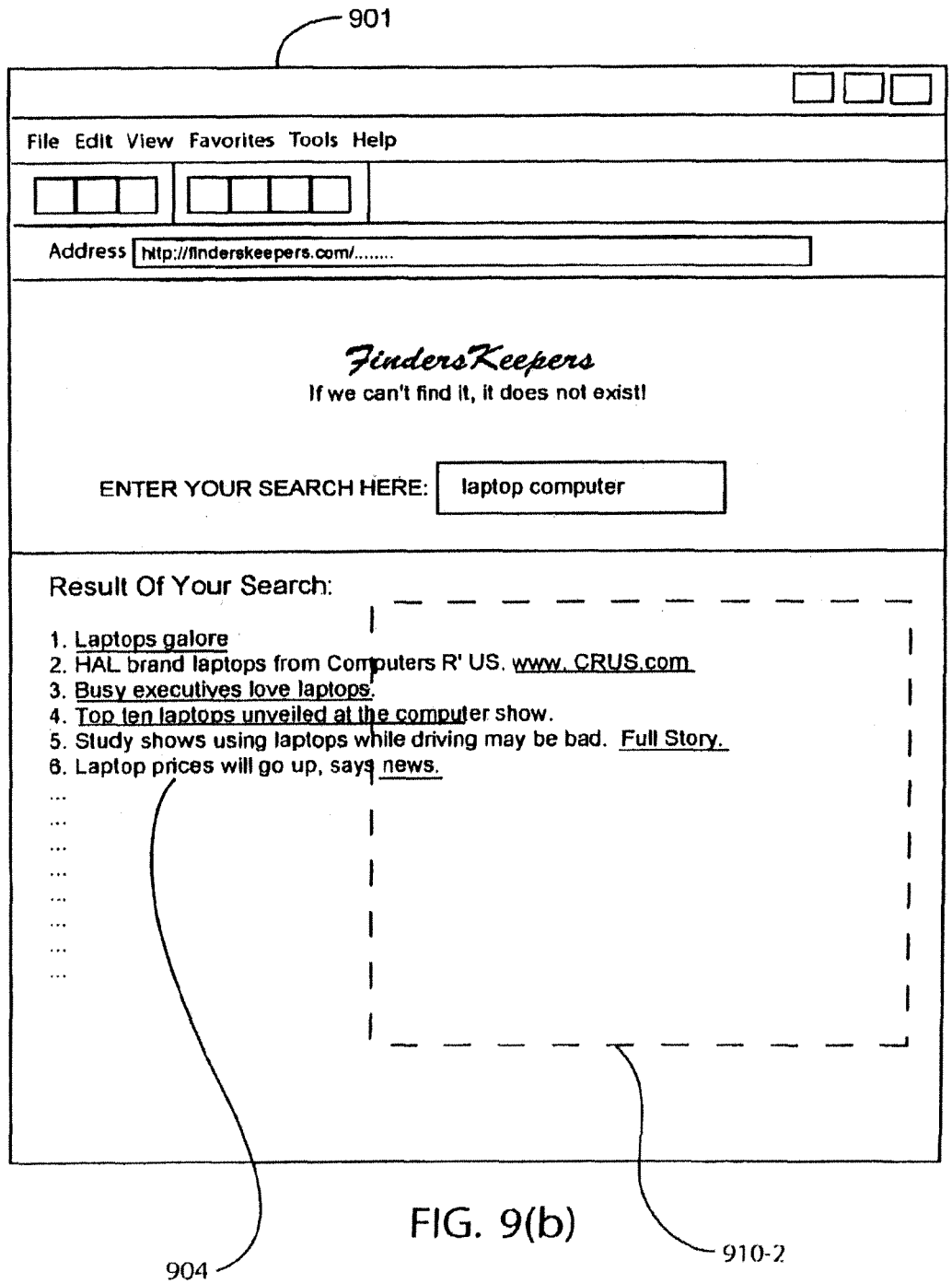

In FIG. 9(b), the end-user refines his search by submitting a search request for the keywords "laptop" and "computer". In response, the original search engine provides a search result 904. Pop-under 910, now labeled 910-2, is updated by message delivery program 200 to contain a new search result (not shown), this time for the keywords "laptop" and "computer". Unlike pop-unders that are created once and stay the same until closed by the end-user, pop-under 910 may be updated to contain more relevant content. In this example, pop-under 910 is updated to contain the most recent search result, thus minimizing proliferation of windows on the end-user's computer screen.

Figure 9C:
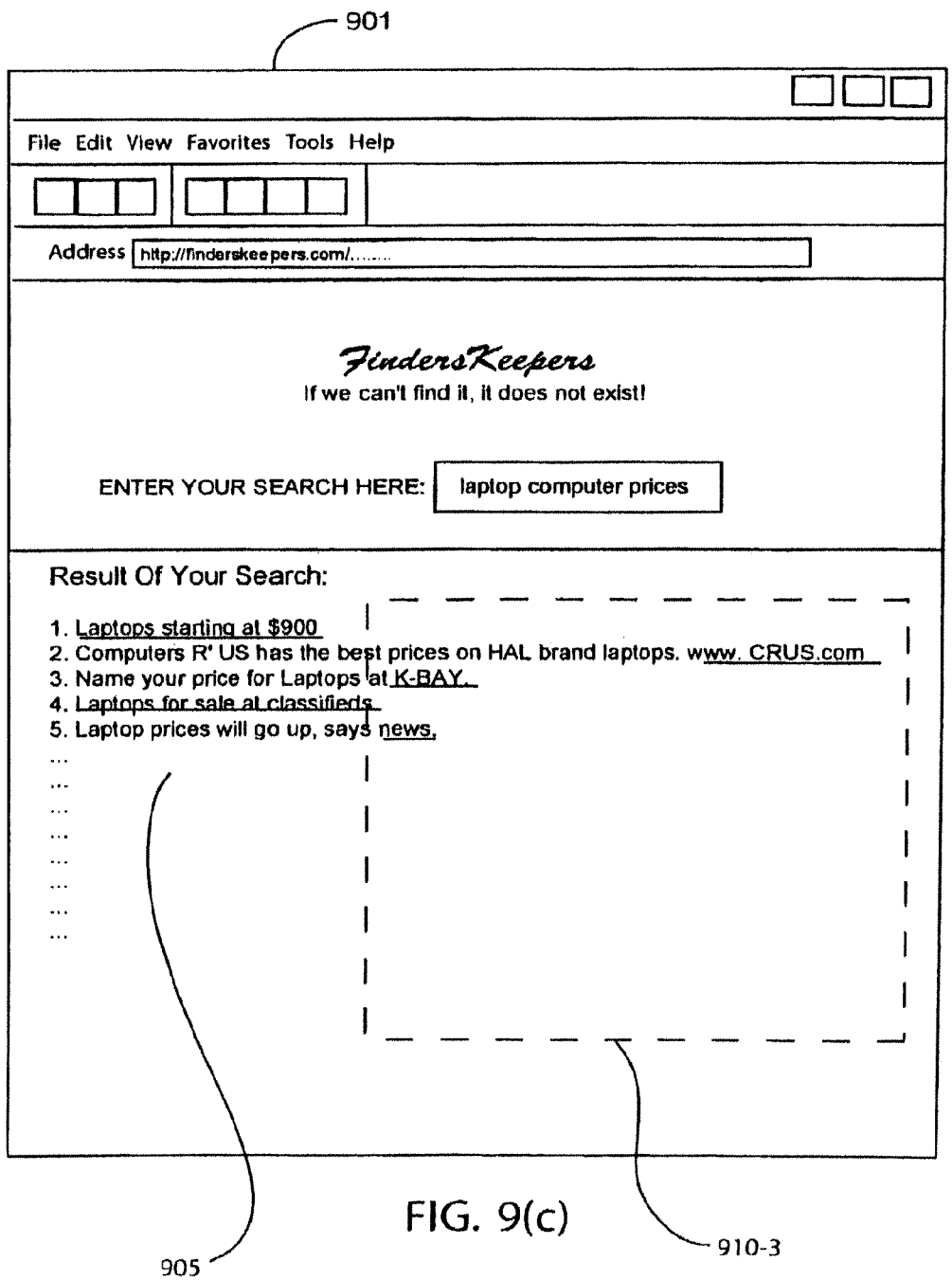

In FIG. 9(c), the end-user refines his search once again by submitting the keywords "laptop", "computer", and "prices" to the original search engine. The original search engine responds to the new search request by providing a search result 905. Pop-under 910, now labeled 910-3, is updated by message delivery program 200 to contain the latest search result, which is responsive to the search request for the keywords "laptop", "computer", and "prices".

Figure 9D:
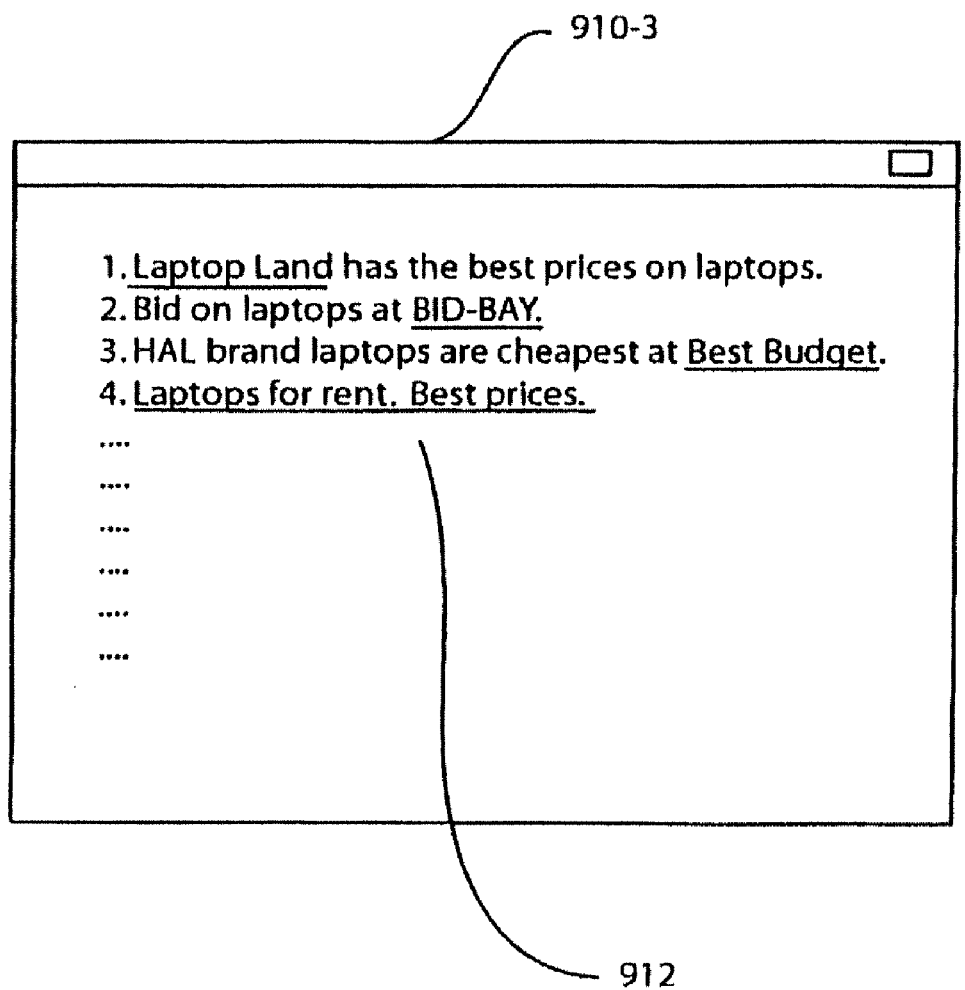

FIG. 9(d) schematically shows how pop-under 910-3 may look like after web browser 901 and other overlying windows are closed, re-arranged, or minimized. In FIG. 9(d), pop-under 910-3 displays a content 912, which is a search result for the keywords "laptop", "computer", and "prices". Pop-under 910 may be updated with another content should the end-user decide to submit another search request.

Figure 10:
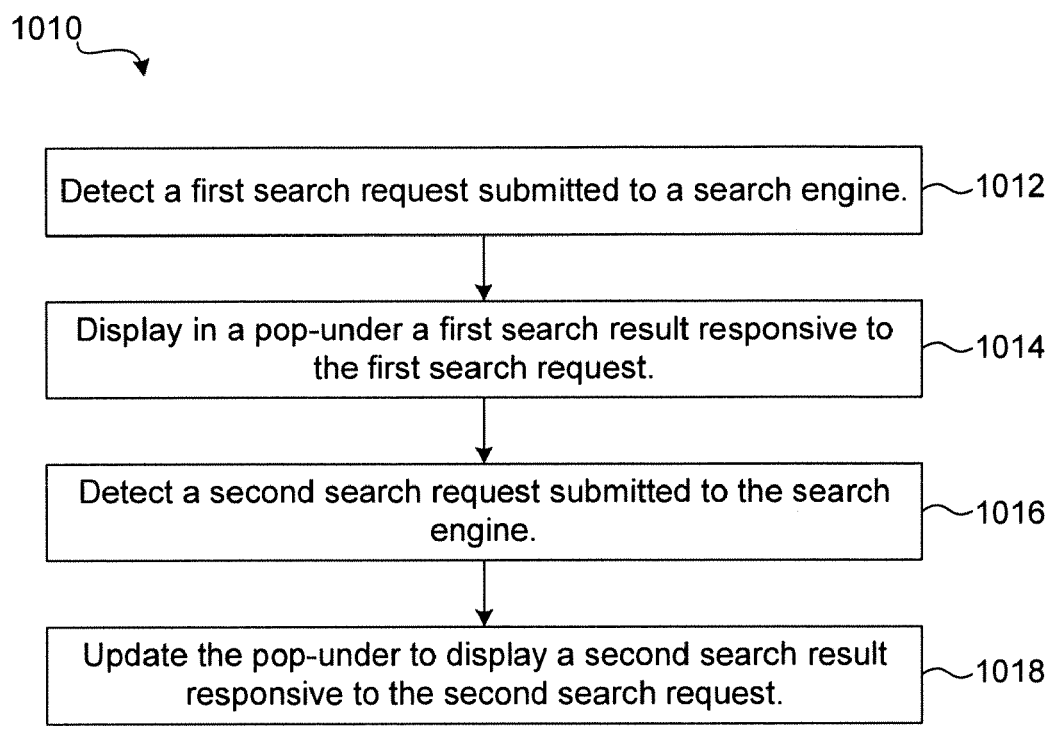
FIG. 10 shows a flow diagram of a method of displaying information received over a computer network in accordance with an embodiment of the present invention.

Referring now to FIG. 10, there is shown a flow diagram of a method 1010 of displaying information received over a computer network in accordance with an embodiment of the present invention. In step 1012, a client program (e.g., a message delivery program 200) detects a first search request submitted by an end-user to an original search engine. In response, the original search engine provides a search result referred to as an "original search result". As is conventional, the original search result may be displayed in the same web browser employed by the end-user to submit the search request.

In step 1014, the client program displays a first search result responsive to the first search request. The first search result may be displayed in a pop-under, which is not viewable until the end-user clears away overlying windows. That is, the first search result may be displayed under the web browser containing the original search result. The first search result may be generated by a single server computer (e.g., a message server computer 103) or a network of server computers that include a search engine.

In step 1016, the client program detects a second search request submitted by the end-user. The second search request may be submitted to the same original search engine or to another original search engine. The second search request may be a refinement of the first search request, or a completely new, unrelated search request.

In step 1018, the client program updates the same pop-under (that used to contain the first search result) to display a second search result responsive to the second search request. For example, the second search result may be posted on the same web page where the first search result was posted. The pop-under, which still points to the same web page, may then be refreshed to display the second search result.

As can be appreciated from the foregoing, an updateable presentation vehicle is useful in applications other than displaying of search results. For example, an updateable pop-up may be employed to display the most current, relevant content. This is in contrast to the conventional way of creating separate pop-ups for different contents.

Figure 11:
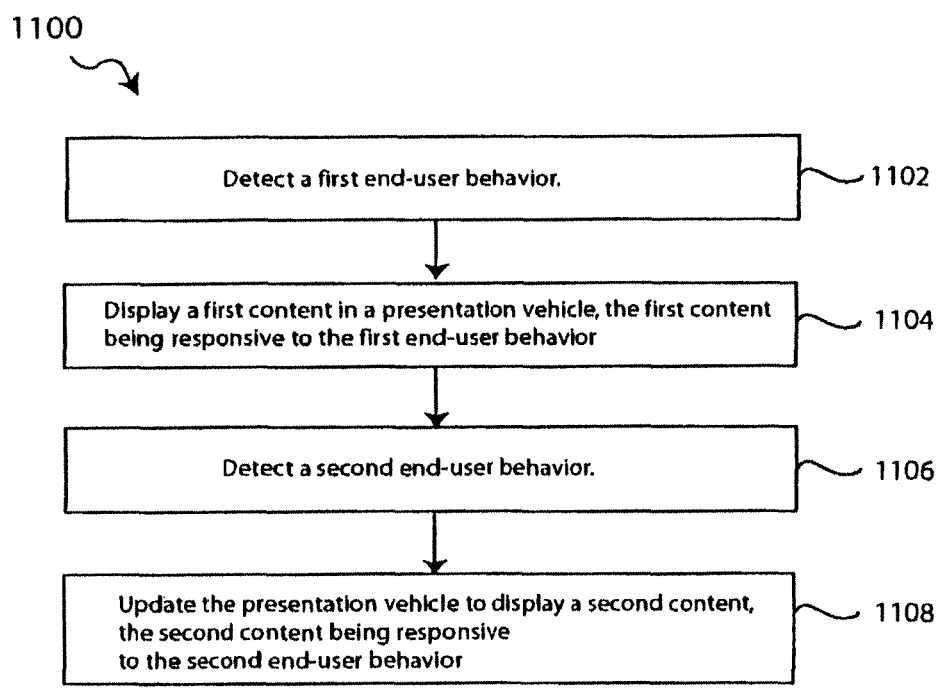
FIG. 11 shows a flow diagram of another method of displaying information received over a computer network in accordance with an embodiment of the present invention.

FIG. 11 shows a flow diagram of a method 1100 of displaying information received over a computer network in accordance with an embodiment of the present invention. In step 1102, a client program (e.g., a message delivery program 200) detects a first end-user behavior. An end-user behavior may be the submission of a search request to an original search engine as described above, or some other activity that an end-user engages in while on the network. For example, an end-user behavior may be navigation from one web site to another web site. The navigation to a particular web site may trigger the client program to initiate delivery of message units to the client computer employed by the end-user. The message units may call for the use of a pop-up or some other presentation vehicle to display advertising or other types of information.

In step 1104, the client program displays a first content in a presentation vehicle in response to the first end-user behavior. For example, the client program may initiate displaying of a search result, an advertisement, or other types of information in the presentation vehicle.

In step 1106, the client program detects a second end-user behavior.

In step 1108, the client program updates the same presentation vehicle with a second content that is responsive to the second end-user behavior. For example, the client program may initiate display of a car advertisement in a pop-up when the end-user navigates from one web site to a car-related web site, and then initiate display of a wine advertisement in the same pop-up when the end-user navigates from the car-related web site to a wine-related web site.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A computer-implemented method to be performed, at least in part, by hardware in combination with software in a server computer, the method comprising:
   receiving from a message delivery program on a client computer a first keyword submitted by a web browser on the client compute to an original search engine, the original search engine not being a part of the server computer, the web browser being separate from the message delivery program; and
   providing the client computer a first search result that is different from a search result provided by the original search engine.

2. The method of claim 1 wherein the message delivery program is browser independent.

3. The method of claim 1 wherein the original search engine is an internet search engine.

4. The method of claim 1 further comprising:
   receiving from the client computer a second keyword submitted to the original search engine; and
   providing the client computer a second search result that is different from another search result provided by the original search engine.

5. The method of claim 4 wherein the first search result is displayed in a presentation vehicle that is updated to display the second search result.

6. The method of claim 5 wherein the presentation vehicle comprises a pop-under.

7. The method of claim 5 wherein the presentation vehicle comprises one or more of: a pop-up, a pop-under, a banner, a message box, a text box, a slider, a separate window, and a window embedded in a web page.

8. An apparatus for receiving information over a computer network, the apparatus comprising:
   a client computer configured to submit, by a browser, a first search request and to receive a first search result and a second search result responsive to the first search request, the first search result to be displayed in a first window and a second search result to be displayed in a second window, the first window being displayed in the browser, the second window being displayed in a presentation vehicle separate from the browser.

9. The apparatus of claim 8 wherein the second window is displayed under the first window.

10. The apparatus of claim 8 wherein the client computer is further configured to receive a third search result that is responsive to another search request, the third search result is to be displayed in the second window.

11. The apparatus of claim 10 wherein the first window comprises a web browser pointed to a search engine and the second window comprises a pop-under.

12. A computer-implemented method of presenting information to an end-user in a computer network, the method being implemented, at least in part, by hardware in combination with software, the method comprising:
   detecting a first end-user behavior in a browser;
   displaying a first content in a presentation vehicle separate from the browser, the first content being responsive to the first end-user behavior;
   detecting a second end-user behavior; and
   updating the presentation vehicle with a second content responsive to the second end-user behavior.

13. The method of claim 12 wherein the presentation vehicle comprises one or more of: a pop-up, a pop-under, a banner, a message box, a text box, a slider, a separate window, and a window embedded in a web page.

14. A computer-readable medium, the computer-readable medium comprising executable instructions, the instructions executable by a processor to perform operations comprising:
receiving from a message delivery program on a client computer a first keyword submitted by a web browser on the client computer to an original search engine, the original search engine not being a part of the server computer, the web browser being separate from the message delivery program; and
providing the client computer a first search result that is different from a search result provided by the original search engine.

15. The method of claim 12 wherein the first content comprises a first search result and the second content comprises a second search result.

16. The method of claim 12 wherein the first end-user behavior comprises submitting a first search request and the second end-user behavior comprises submitting a second search request.

17. The method of claim 16 wherein the first search request is submitted to a first search engine.

18. The method of claim 17 wherein the first search engine is an Internet search engine.

19. The method of claim 16 wherein the first search request and the second search request are submitted to the same search engine.

20. The method of claim 12 wherein the first end-user behavior comprises navigating to a first web page and the second end-user behavior comprises navigating to a second web page.

21. The method of claim 20 wherein the first content is distinct from the first web page and the second web page, and wherein the second content is distinct from the first web page and the second web page.

22. The method of claim 12 wherein the presentation vehicle is browser independent.

23. The method of claim 12 wherein the presentation vehicle operates independent of the browser.

24. The method of claim 12 wherein the first end-user behavior comprises submitting a first search request to a first search engine, and the second end-user behavior comprises submitting a second search request to the first search engine, and wherein:
the first content is distinct from a first search result from said first search engine in response to said first search request and
the second content is distinct from a second search result from said first search engine in response to said second search request.

25. The method of claim 12 wherein:
the first end-user behavior is one of: (i) submitting a first search request; and (ii) navigating to a first web page; and wherein
the second end-user behavior is one of: (iii) submitting a second search request; and (iv) navigating to a second web page.

26. The method of claim 12 wherein detecting the first end-user behavior is performed using a program operating separately from the browser.

27. The method of claim 12 wherein one of the first end-user behavior and the second end-user behavior comprises navigating to a specific web page, and wherein one of the first content and the second content was selected based, at least in part, on a domain name of the specific web page.

28. The computer-readable medium of claim 14 wherein the message delivery program is browser independent.

29. The computer-readable medium of claim 14 further comprising instructions executable by a processor to perform:
receiving from the client computer a second keyword submitted to the original search engine; and
providing the client computer a second search result that is different from another search result provided by the original search engine.

30. The computer-readable medium of claim 29 wherein the first search result is displayed in a presentation vehicle that is updated to display the second search result.

31. The computer-readable medium of claim 30 wherein the presentation vehicle comprises a pop-under.

32. A computer-readable medium, the computer-readable medium comprising executable instructions, the instructions executable by a processor to perform operations comprising:
detecting a first end-user behavior in a browser;
displaying a first content in a presentation vehicle separate from the browser, the first content being responsive to the first end-user behavior;
detecting a second end-user behavior; and
updating the presentation vehicle with a second content responsive to the second end-user behavior.

33. The computer-readable medium of claim 32 wherein the first end-user behavior comprises submitting a first search request and the second end-user behavior comprises submitting a second search request.

34. The computer-readable medium of claim 32 wherein the first content comprises a first search result and the second content comprises a second search result.

35. The computer-readable medium of claim 32 wherein the first end-user behavior comprises navigating to a first web page and the second end-user behavior comprises navigating to a second web page.

36. A computer-implemented method, implemented at least in part by hardware in combination with software, the method comprising:
receiving from a client computer a first keyword, said first keyword having been submitted on the client computer to a first search engine, the first search engine being distinct from a first server computer; and
in response to said receiving, said first server computer providing the client computer first message content,
wherein said first message content is distinct from a search result provided by said first search engine in response to said first keyword having been submitted to said first search engine.

37. The method of claim 36 wherein the first keyword is received from a message delivery program on the client computer.

38. The method of claim 37 wherein the message delivery program is browser independent.

39. The method of claim 36 wherein the first message content comprises at least one of: video content, audio content, and program code.

40. The method of claim 39 wherein;
when the first message content includes displayable message content, the displayable message content is processed by displaying the displayable message content on a computer screen, and
when the first message content includes computer-readable program code, the message content is processed by running the program code.

41. A computer-implemented method, implemented, at least in part, by hardware in combination with software, the method comprising:
- responsive to a first end-user behavior in a browser on a computer device, presenting a first message content in a presentation vehicle on said computer device, the presentation vehicle being separate from the browser;
- responsive to a second end-user behavior on the computer device, updating the presentation vehicle with a second message content responsive to the second end-user behavior, wherein:
- the first end-user behavior comprises at least one of: (i) submitting a first search request; and (ii) navigating to a first web page; and wherein
- the second end-user behavior comprises at least one of: (iii) submitting a second search request; and (iv) navigating to a second web page, and wherein
- the first message content comprises at least one of: first video content, first audio content, and first program code, and wherein
- the second message content comprises at least one of: second video content, second audio content, and second program code.

42. The method of claim 41 wherein the presentation vehicle is separate from a browser.

43. The method of claim 41 wherein the presentation vehicle comprises one or more of: a pop-up, a pop-under, a banner, a message box, a text box, a slider, a separate window, and a window embedded in a web page.

* * * * *

UNITED STATES PATENT AND TRADEMARK OFFICE
CERTIFICATE OF CORRECTION

PATENT NO. : 8,316,003 B2
APPLICATION NO. : 12/577702
DATED : November 20, 2012
INVENTOR(S) : Martin et al.

It is certified that error appears in the above-identified patent and that said Letters Patent is hereby corrected as shown below:

On Title Page 7, in Item (56), under "FOREIGN PATENT DOCUMENTS", in Column 1, Line 25, delete "WO WO01/90917 11/2001".

On Title Page 7, in Item (56), under "OTHER PUBLICATIONS", in Column 1, Line 21, delete "<URL" and insert -- <URL: --, therefor.

On Title Page 7, in Item (56), under "OTHER PUBLICATIONS", in Column 1, Line 42, delete "<URL.http//" and insert -- <URL:http// --, therefor.

On Title Page 7, in Item (56), under "OTHER PUBLICATIONS", in Column 2, Line 8, delete "cnet com" and insert -- cnet.com --, therefor.

On Title Page 7, in Item (56), under "OTHER PUBLICATIONS", in Column 2, Line 18, delete "<URL.http/download cnet" and insert -- <URL:http//download.cnet --, therefor.

On Title Page 7, in Item (56), under "OTHER PUBLICATIONS", in Column 2, Line 19, delete "902347 html>." and insert -- 902347.html>. --, therefor.

On Title Page 7, in Item (56), under "OTHER PUBLICATIONS", in Column 2, Line 39, delete "download cnet.com" and insert -- download.cnet.com --, therefor.

On Title Page 7, in Item (56), under "OTHER PUBLICATIONS", in Column 2, Line 49, delete "webpage)" and insert -- webpage --, therefor.

On Title Page 7, in Item (56), under "OTHER PUBLICATIONS", in Column 2, Line 50, delete "intemet:" and insert -- internet: --, therefor.

On Title Page 7, in Item (56), under "OTHER PUBLICATIONS", in Column 2, Line 57, delete "<URL.http" and insert -- <URL:http --, therefor.

Signed and Sealed this
Eleventh Day of March, 2014

Michelle K. Lee
*Deputy Director of the United States Patent and Trademark Office*

CERTIFICATE OF CORRECTION (continued)
U.S. Pat. No. 8,316,003 B2

On Title Page 7, in Item (56), under "OTHER PUBLICATIONS", in Column 2, Line 61, delete "Probalistic" and insert -- Probabilistic --, therefor.

On Title Page 7, in Item (56), under "OTHER PUBLICATIONS", in Column 2, Line 68, delete "(downloaded." and insert -- (downloaded). --, therefor.

On Title Page 8, in Item (56), under "OTHER PUBLICATIONS", in Column 2, Line 26, delete "Wrtitten" and insert -- Written --, therefor.

On Title Page 8, in Item (56), under "OTHER PUBLICATIONS", in Column 2, Line 72, delete "plublished" and insert -- published --, therefor.

On Title Page 9, in Item (56), under "OTHER PUBLICATIONS", in Column 1, Line 38, delete "895339 html>." and insert -- 895339.html>. --, therefor.

On Title Page 9, in Item (56), under "OTHER PUBLICATIONS", in Column 1, Line 41, delete "2497932 html>." and insert -- 2497932.html>. --, therefor.

On Title Page 9, in Item (56), under "OTHER PUBLICATIONS", in Column 1, Line 42, delete "[online)," and insert -- [online], --, therefor.

On Title Page 9, in Item (56), under "OTHER PUBLICATIONS", in Column 1, Line 43, delete "intemet:" and insert -- internet: --, therefor.

On Title Page 9, in Item (56), under "OTHER PUBLICATIONS", in Column 2, Line 47, delete "Offie" and insert -- Office --, therefor.

On Title Page 10, in Item (56), under "OTHER PUBLICATIONS", in Column 1, Line 17, delete "<URL" and insert -- <URL: --, therefor.

On Title Page 10, in Item (56), under "OTHER PUBLICATIONS", in Column 1, Line 26, delete "<URL.http" and insert -- <URL:http --, therefor.

On Title Page 10, in Item (56), under "OTHER PUBLICATIONS", in Column 1, Line 27, delete "7253644 html>." and insert -- 7253644.html>. --, therefor.

On Title Page 10, in Item (56), under "OTHER PUBLICATIONS", in Column 1, Line 29, delete ":http/" and insert -- :http// --, therefor.

On Title Page 11, in Item (56), under "OTHER PUBLICATIONS", in Column 1, Line 20, delete "] retrieved" and insert -- [ retrieved --, therefor.

On Title Page 11, in Item (56), under "OTHER PUBLICATIONS", in Column 2, Line 2, delete "2002}." and insert -- 2002]. --, therefor.

In the Drawings

In Fig. 4B (Part 1), Sheet 5 of 17, below "Address", Line 10,
delete "_www.carshowplcs.com" and insert -- _www.carshowpics.com --, therefor.

In Fig. 4B (Part 1), Sheet 5 of 17, below "Address", Line 31, delete "taht" and insert -- that --, therefor.

In Fig. 9 (a), Sheet 12 of 17, below "Result Of Your Search:", Line 4, delete "schoolds" and insert -- schools --, therefor.

In Fig. 11, Sheet 17 of 17, for Tag "1104", Line 2, delete "behavior" and insert -- behavior. --, therefor.

In Fig. 11, Sheet 17 of 17, for Tag "1108", Line 3, delete "behavior" and insert -- behavior. --, therefor.

In the Specification

In Column 3, Line 7, delete "A exemplary" and insert -- An exemplary --, therefor.

In Column 3, Line 64, delete "DESCRIPTION" and insert -- BRIEF DESCRIPTION --, therefor.

In Column 6, Line 28, delete "Explorer™." and insert -- Explorer™ --, therefor.

In Column 12, Line 23, delete "processed" and insert -- processed. --, therefor.

In the Claims

In Column 16, Line 10, in Claim 1, delete "compute" and insert -- computer --, therefor.

In Column 16, Line 20, in Claim 3, delete "internet" and insert -- Internet --, therefor.

In Column 17, Line 49, in Claim 24, delete "request" and insert -- request; --, therefor.